United States Patent [19]
Kayano et al.

[11] Patent Number: 5,544,054
[45] Date of Patent: Aug. 6, 1996

[54] VEHICLE MULTI-PROCESSOR CONTROL SYSTEM AND METHOD WITH PROCESSING LOAD OPTIMIZATION

[75] Inventors: Mitsuo Kayano, Hitachi; Toshimichi Minowa, Toukai-mura; Junichi Ishii, Katsuta; Shigeki Morinaga, Hitachi, all of Japan

[73] Assignee: Hitachi, Ltd., Tokyo, Japan

[21] Appl. No.: 550,876

[22] Filed: Oct. 31, 1995

Related U.S. Application Data

[63] Continuation of Ser. No. 249,619, May 26, 1994, abandoned.

[30] Foreign Application Priority Data

Jun. 22, 1993 [JP] Japan ................... 5-150098

[51] Int. Cl.$^6$ ................................. G06F 15/16
[52] U.S. Cl. ........................ 364/424.01; 395/200.03; 364/131
[58] Field of Search ................ 395/200.03, 650; 364/424.01, 131, 133, 431.01, 431.04, 431.11, 431.12

[56] References Cited

U.S. PATENT DOCUMENTS

| | | | |
|---|---|---|---|
| 4,318,173 | 3/1982 | Freedman et al. | 364/650 |
| 4,532,594 | 7/1985 | Hosaka et al. | 364/431.11 |
| 4,663,387 | 12/1986 | Hartung et al. | 364/200 |
| 4,797,828 | 1/1989 | Suzuki et al. | 364/431.04 |
| 4,839,798 | 6/1989 | Eguchi et al. | 364/200 |
| 4,843,557 | 6/1989 | Ina et al. | 364/431.11 |
| 5,157,610 | 10/1992 | Asano et al. | 364/424.03 |
| 5,369,581 | 11/1994 | Ohsuga et al. | 364/424.05 |

FOREIGN PATENT DOCUMENTS 3-243426  10/1991  Japan.

*Primary Examiner*—Michael Zanelli
*Attorney, Agent, or Firm*—Evenson, McKeown, Edwards & Lenahan, P.L.L.C.

[57] ABSTRACT

An automatic control system comprises a plurality of control processors which are connected by such transmission devices as LAN, BUS and so on. Control processing load to be executed by each of the control processors are detected and each control processor executes necessary and minimum control tasks corresponding to running state information on an automobile and carries on another control tasks in the remaining time based on the detected load of each control processor so as to smooth loads of the control processors.

6 Claims, 22 Drawing Sheets

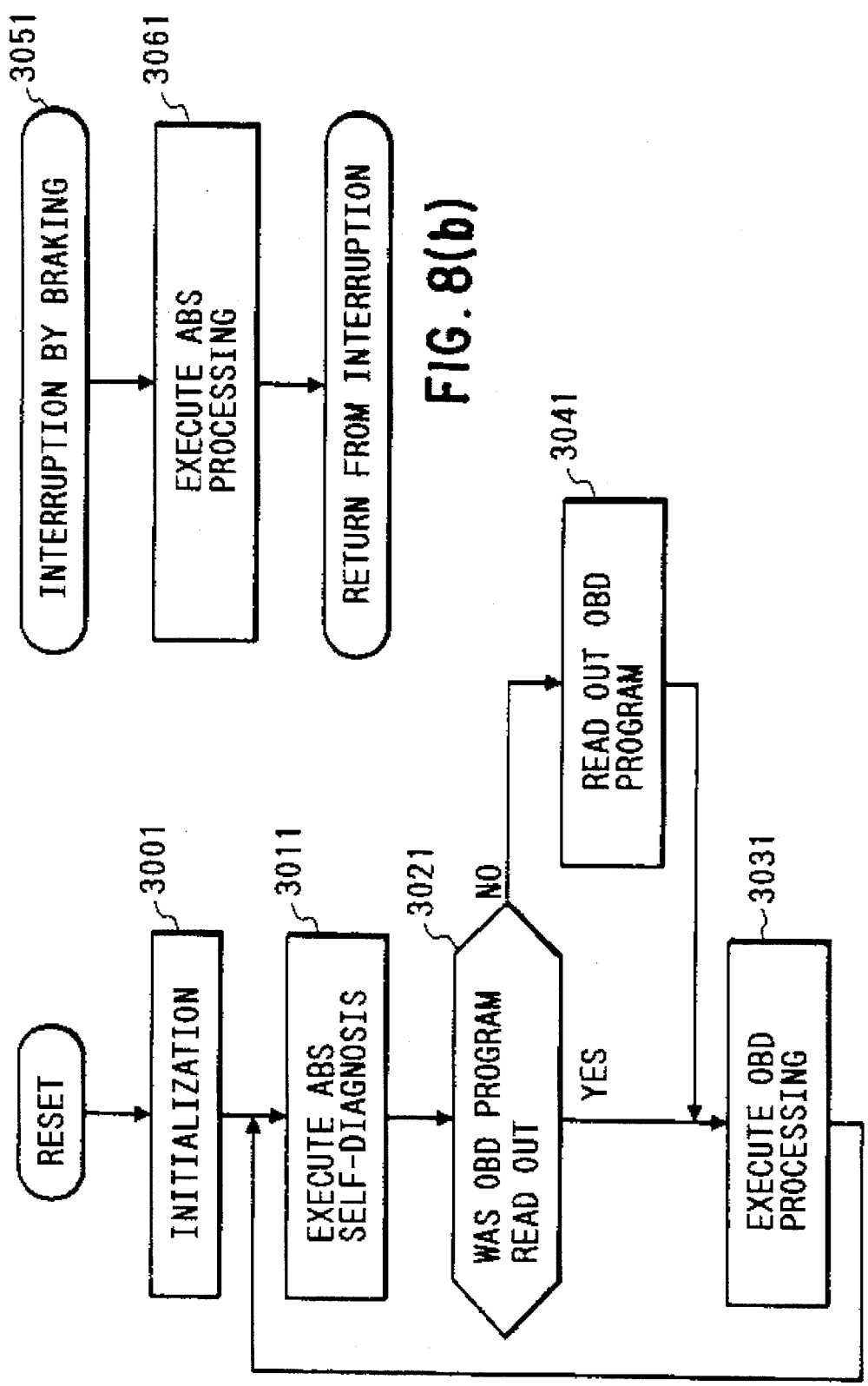

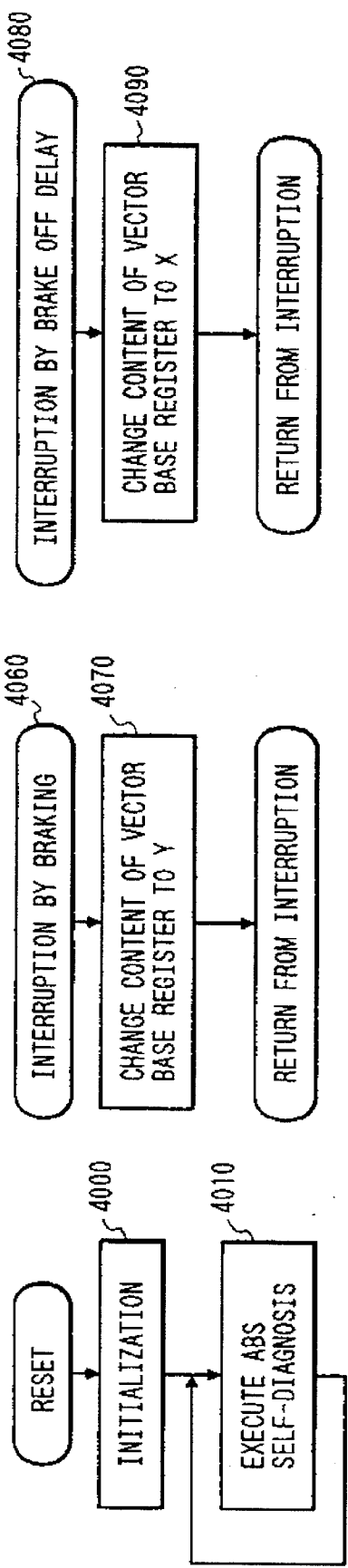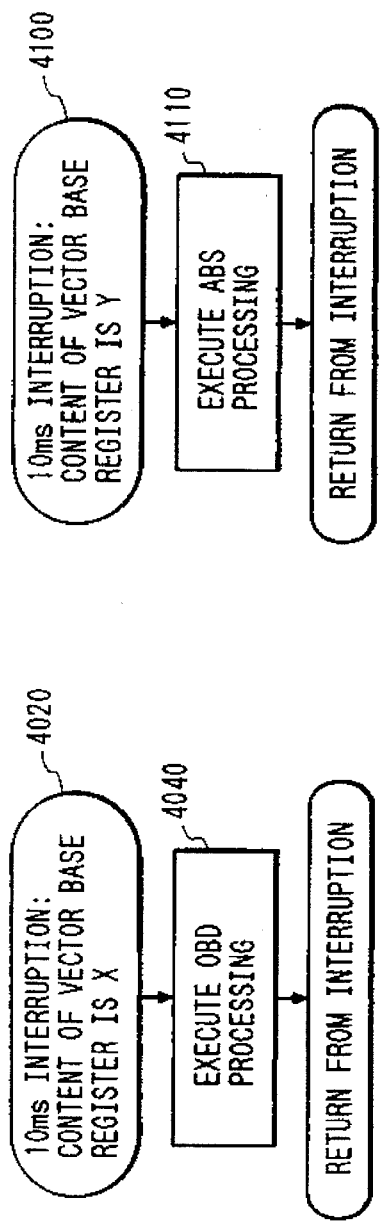
FIG. 9(a) FIG. 9(b) FIG. 9(c) FIG. 9(d) FIG. 9(e)

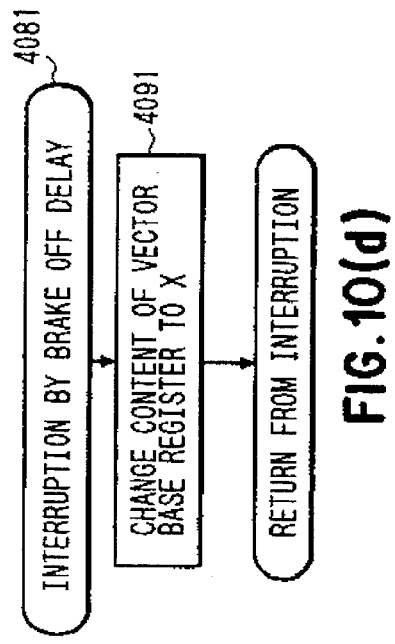
FIG.10(d)
FIG.10(e)
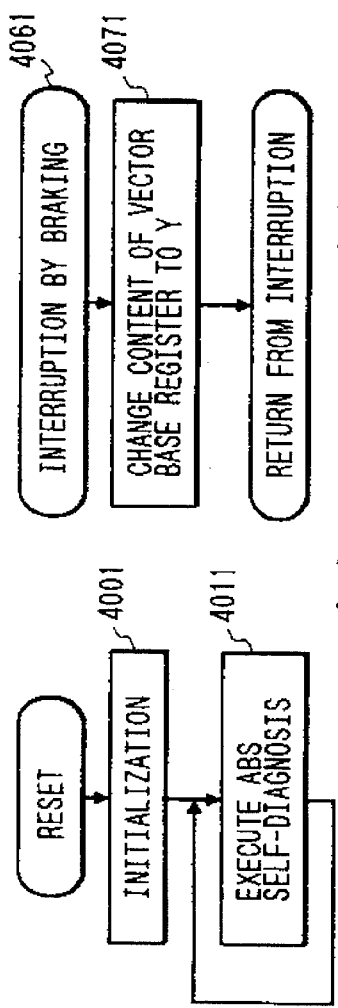
FIG.10(c)
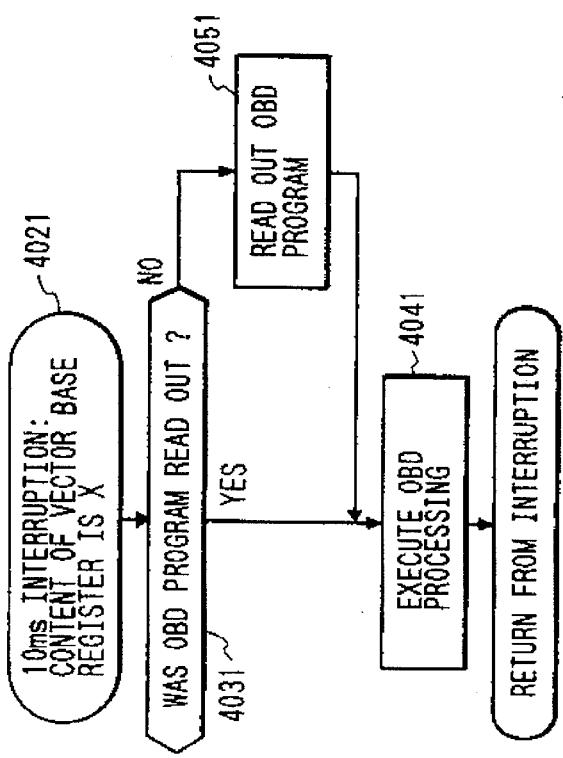
FIG.10(a)
FIG.10(b)

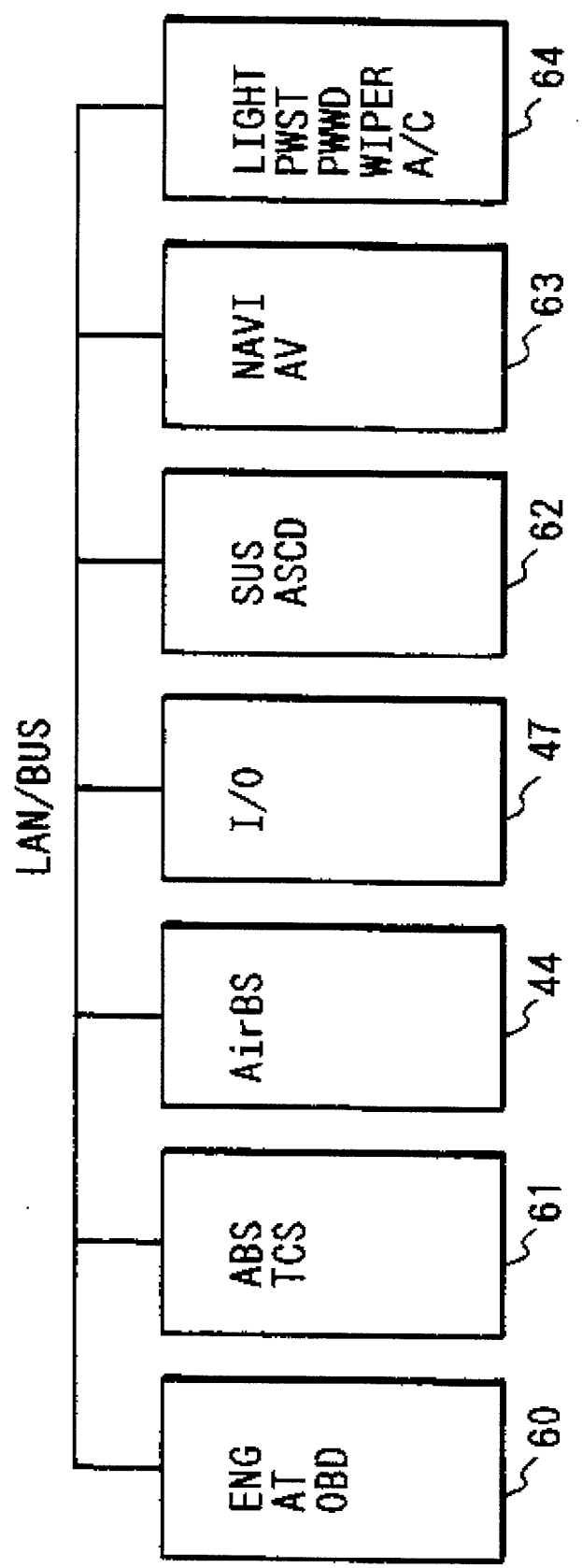

VEHICLE MULTI-PROCESSOR CONTROL SYSTEM AND METHOD WITH PROCESSING LOAD OPTIMIZATION

This application is a continuation of application Ser. No. 08/249,619, filed on May 26, 1994, now abandoned.

BACKGROUND OF THE INVENTION

1. Field of the Invention

The present invention relates to a control system installed in an automobile, particularly to a method and a system for controlling an automobile comprising a plurality of control units using computers to execute various kinds of controls.

2. Description of the Related Art

As a conventional method for controlling each part of an automobile by use of plural control units, one described in A Japan Patent Application Laid-Open 243426/1991 is known.

In this conventional method, plural computers monitor the presence of troubles in each other and execute cooperative operations by changing control tasks in accordance with the presence of troubles in another computer.

Although the control tasks executed in a computer itself can be changed in accordance with the presence of troubles in other computers by the above-mentioned conventional method, a computer does not execute tasks to be executed in another computer, taking the place of another computer in accordance with load states of another computer.

For example, control tasks are executed by such exclusive processors as an engine control exclusive processor, an automatic transmission (AT) control exclusive processor and so on. Then, while some exclusive processor has no control task to execute, the processor has wasteful time not to be utilized. For instance, an automatic braking system (ABS) exclusive processor must execute control tasks for ABS at the braking time. On the other hand, control tasks for the ABS would be wastefully done at the non-braking time.

SUMMARY OF THE INVENTION

1. Objects of the Invention

The present invention has been achieved in consideration of the above-described problems, and is aimed at providing a method and a system to adjust the processing amount of each control unit by adding or removing some tasks to or from control units in accordance with the processing amount (control load) of each control unit whose control load changes corresponding to running states of an automobile.

2. Methods Solving the Problems

The fundamental features of the present invention are to provide a control method of an automobile wherein at least one control unit executes at least one control task program of another control unit having higher control load in controlling each part of an automobile by connecting a plurality of control units using computers with a transmission line, and to provide a control system of an automobile wherein a plurality of control units using computers for controlling each part of an automobile are connected with a transmission line and at least one of the control units has at least one electrically rewritable memory for storing at least one control task program of another control unit having higher control load.

BRIEF DESCRIPTION OF THE DRAWINGS

FIGS. 8A–8B are flow charts showing another embodiment of a cooperative automobile control method by adopting interruption processing on braking.

FIGS. 9A–9E are flows chart showing an embodiment of a cooperative automobile control method by adopting interruption processing and content change of a vector base register on braking.

FIG. 10A–10E are flow charts showing another embodiment of a cooperative automobile control method by adopting interruption processing and content change of a vector base register on braking.

FIG. 19 shows a block diagram of an embodiment in which integral type processors are used for cooperatively controlling an automobile.

DETAILED DESCRIPTION OF THE EMBODIMENTS

Hereinafter, details of the present invention are explained based on embodiments referring to drawings.

Figure 1:
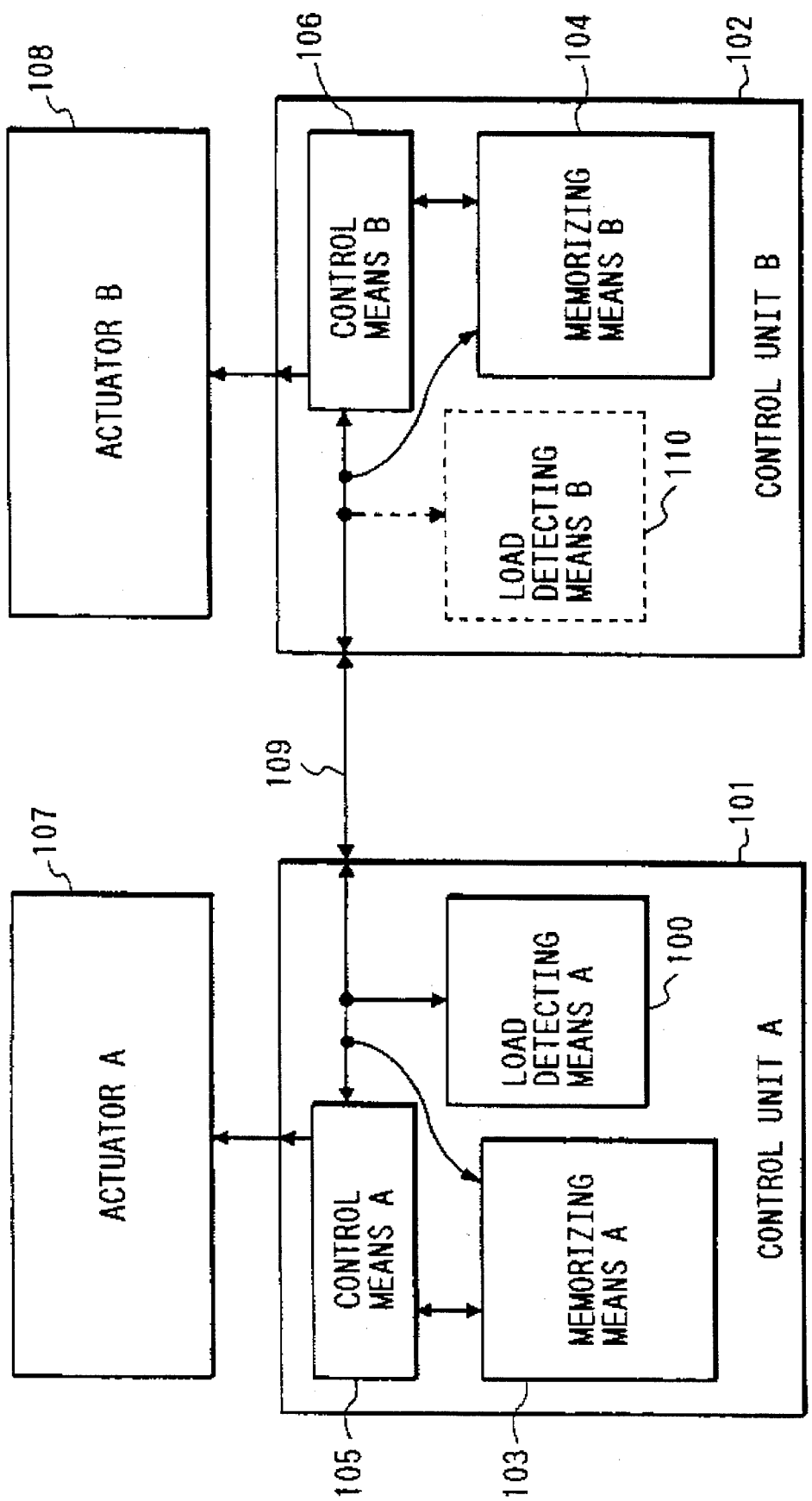
FIG. 1 is a constitution block diagram of an embodiment of an automobile control system.

FIG. 1 is a constitution block diagram of an embodiment of an automobile control system.

The load states in control tasks of each of control units A 101 and B 102 are detected from the present running states and the load states of each of control units A 101 and B 102 by a load detecting means A 100, a program determined based on the load states from programs stored in each of memorizing means A 103 and B 104 is executed, and each of actuators A 107 and B 108 are controlled by each of control means A 105 and B 106. In this case, the load states of a control unit B 102 are detected by the load detecting means A 100 and the detected load states are transmitted to the control means B 106 and the memorizing means B 104 via a transmission line 109 such as a LAN or a BUS. The above-mentioned processing can be done by providing a load detecting means B 110.

The control is carried out to the actuator B 108 via the transmission line 109 such as LAN or BUS in case a program in the memorizing means A 103 controls the actuator B 108. The control is similarly carried out to the actuator A 107 via the transmission line 109 such as LAN or BUS in case a program in the memorizing means B 104 controls the actuator A 107.

In the case of an ABS control and an ABS self-diagnosing program stored in the memorizing means A 103, and an engine control program and an On-Board Diagnosis (OBD) program in the memorizing means B 104, the control task load states of the control units A 101 and B 102 are detected by the load detecting means A 100 and programs adequate to the load states are executed. For example, whether a brake is put on or not is detected by the load detecting means A 100, and if it is put on, then the ABS control program is executed, and if it is not, then the ABS self-diagnosing program and the OBD program are executed, in the control unit A 101. In the control unit B 102, if it is put on, then the engine control program and the OBD program are executed, and if it is not, then only the engine control program is executed.

Figure 2:
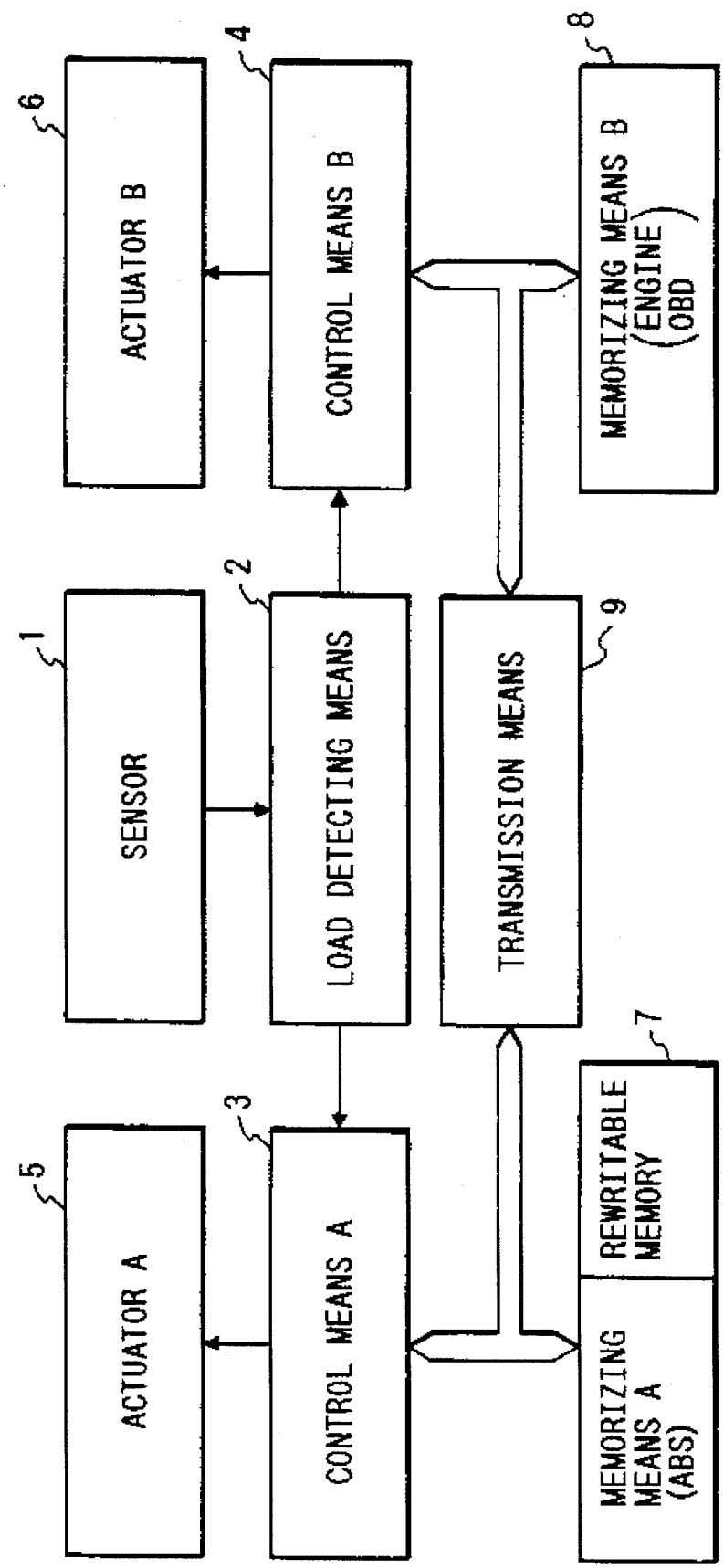
FIG. 2 is a constitution block diagram of another embodiment of an automobile control system.

FIG. 2 is a constitution block diagram of another embodiment of an automobile control system. The outputs of sensors 1 for detecting such state variables indicating the running states of an automobile such as a running speed, a throttle opening, an engine revolution number, a gear position and so on are input into a load detecting means 2, the load states in control tasks of control means A 3 and B 4 needed to be done corresponding to the detected running states are judged by the load detecting means 2 and the judged load states are sent to the control means A 3 and B 4. The control means A 3 and B 4 change control tasks corresponding to the load states and control the actuators A 5 and B 6 to an injection system, an ignition system, a shift solenoid, a lock-up-solenoid, a brake, etc.. And, if the contents of a control task to be executed by the control means A 3 are not stored in the memorizing means A 7 but in the memorizing means B 7, the contents of the control task stored in the memorizing means B 8 is read out and written into the memorizing means A 7 via the transmission line 9 and executed by the control means A 3. Now, it is assumed that the ABS control program is stored in the memorizing means A 7 which also comprises such electrically rewritable memories as an electrically erasable and programmable read only ($E^2$PPROM) or a flash memory, and the engine control and the OBD program are stored in the memorizing means B 8. In this case, an output signal of a brake switch (SW) is taken into the load detecting means 2 and whether the brake SW is ON or OFF is detected. If the brake SW is on, then the ABS control is executed by the control means A 3 and the engine control by the control means B 4. And if the brake SW is OFF, then the OBD program stored in the memorizing means B 8 is read out and written into the electrically rewritable memory via the transmission line 9, executed by the control means A 3, and the engine control is done by the control means B 4. It is possible to efficiently carry out the controls since the OBD can be done when the ABS control is not to be executed. Further, production cost can be reduced since an exclusive control means to the OBD is not necessary.

Figure 3:
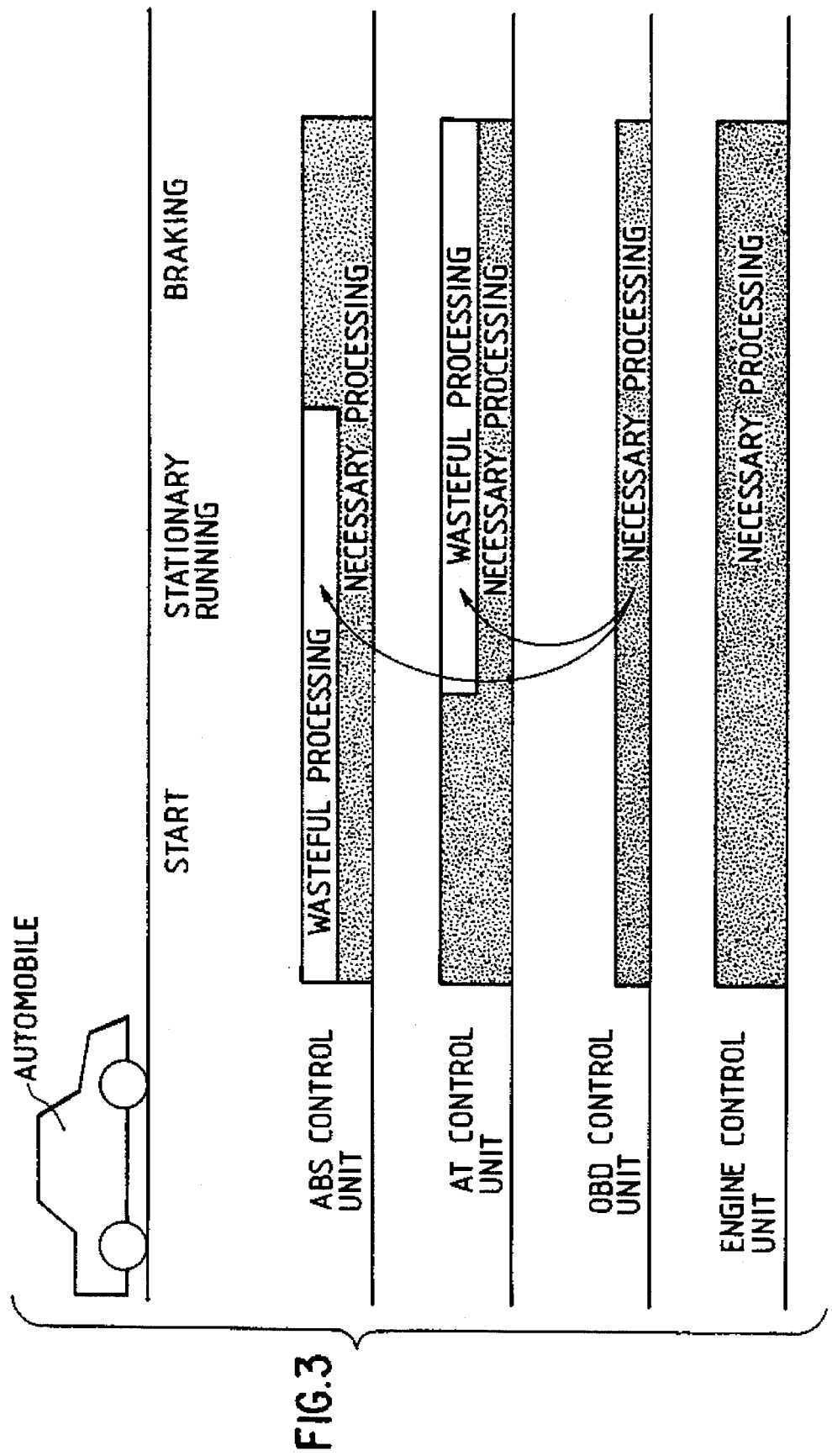
FIG. 3 shows a concept of a cooperative control of an automobile.

FIG. 3 shows a concept of a cooperative control of an automobile. At the start or the stationary running state, the processing load needed to a processor for the ABS control is less in comparison with the maximum processing ability of the processor and the processor may execute wasteful processing. On the other hand, the processor for the ABS control fully uses its processing ability on braking. Although a processor for an AT control fully uses its processing ability at the start state, the processor carries out wasteful processes since the needed processing load is a little. Since the OBD and the engine control are always executed at the start and the stationary running state, it becomes possible to efficiently use the processors for the ABS control and the AT control by executing the OBD processing at the low processing load time of the processors for the ABS and the AT control.

Figure 4:
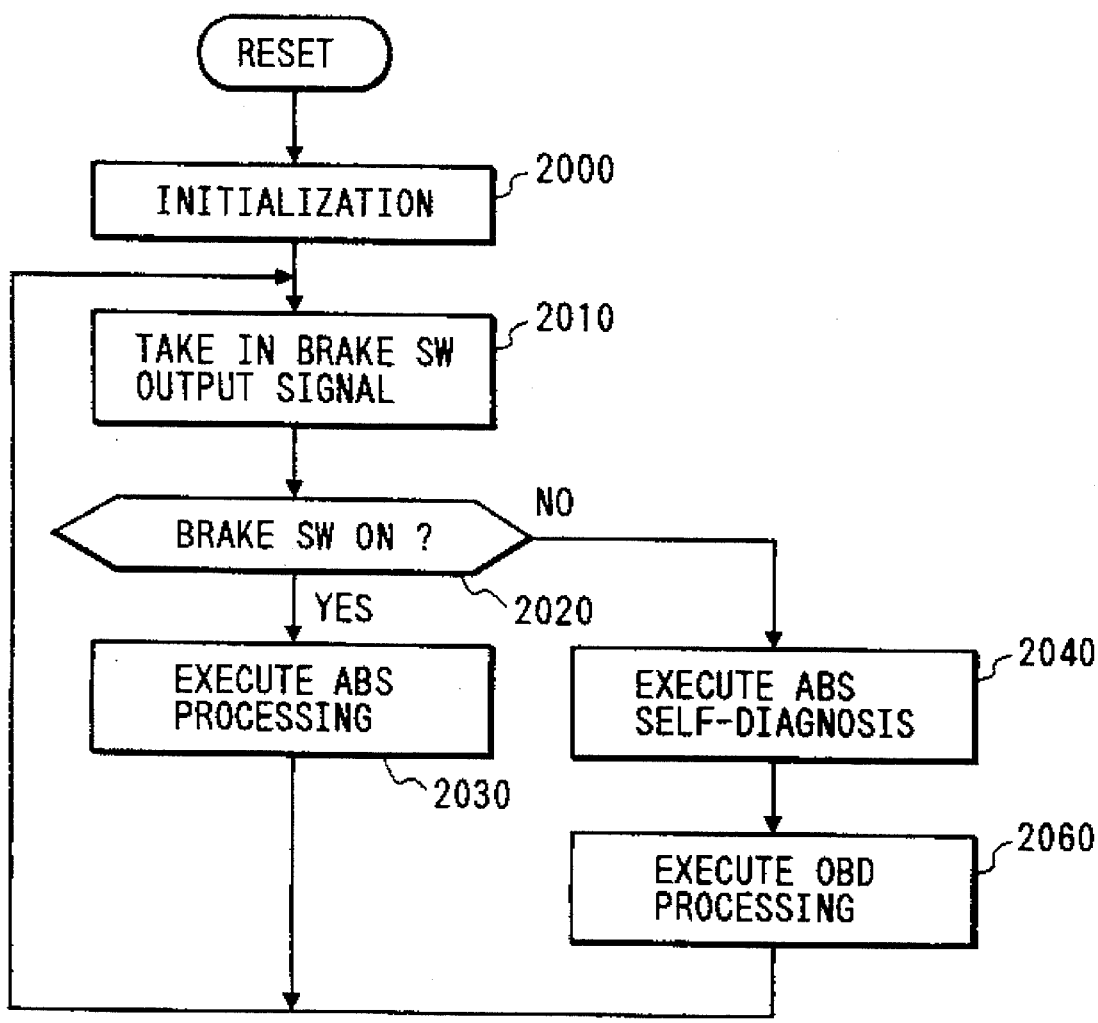
FIG. 4 is a flow chart showing an embodiment of executing OBD processing at the low load time of an ABS control processor.

FIG. 4 is a flow chart showing an embodiment of executing OBD processing at the low load time of an ABS control processor. When a power turns on, initialization of a timer, a port, an A/D converter, RAM, a transmission system, etc. is done at the step 2000, an output signal of a brake SW is taken in at the step 2010, and whether the brake SW is ON or OFF is judged at the step 2020. And, if the brake SW is ON, then the ABS control is executed at the step 2030 and the process goes back to the step 2010 of taking in the output signal of the brake SW. If the brake SW is OFF, then the ABS self-diagnosis is executed at the step 2040, the OBD program stored in advance in the ABS control processor is executed at the step 2060 and the process goes back to the step 2010.

Figure 5:
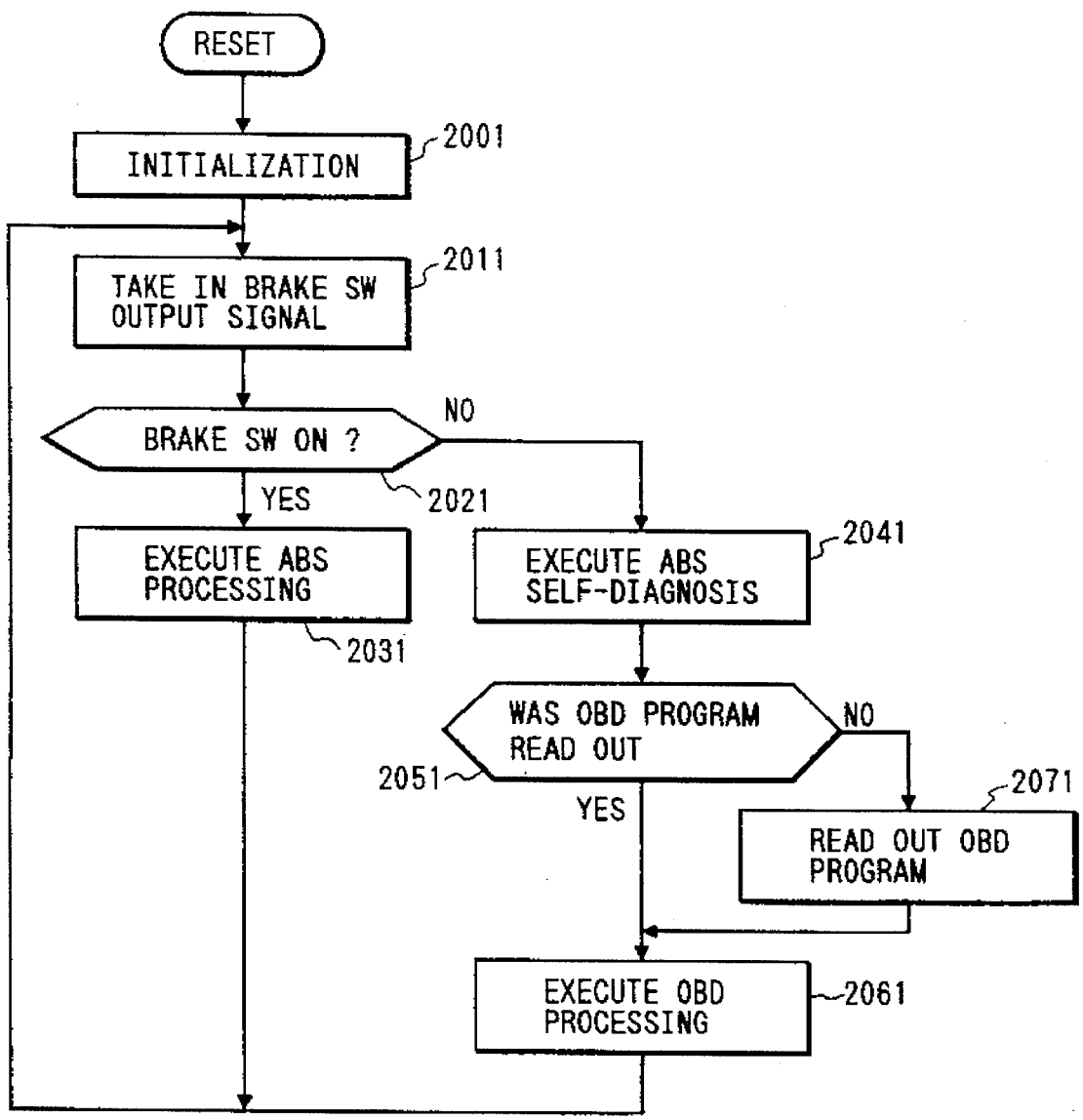
FIG. 5 is a flow chart showing an embodiment of a cooperative control by an ABS control processor.

FIG. 5 is a flow chart showing an embodiment of cooperative control by an ABS control processor. When a power turns on, initialization of a timer, a port, an A/D converter, RAM, a transmission system, etc. is done at the step 2001, an output signal of a brake SW is taken in at the step 2011, and whether the brake SW is ON or OFF is judged at the step 2021. And, if the brake SW is ON, then the ABS control is executed at the step 2031 and the process goes back to the step 2011 of taking in the output signal of the brake SW. If the brake SW is OFF, then the ABS self-diagnosis is executed at the step 2041. And, whether the OBD program was read out and written into the ABS control processor from another processor is judged at the step 2051. If the program is already read out and written, then the OBD program is executed at the step 2061, and if it is not read out and written yet or another program is already written, then the OBD program stored in the engine control processor is read out and written at the step 2071. Then, the read out and written OBD program is executed at the step 2061 and the process goes back to the step 2011. In this case, the ABS control processor and the engine control processor are the same kind, and the address in the engine control processor of the OBD program to be read out and written is the same address in the ABS control processor of the read out OBD program. By such agreement in both addresses of the memories at which the program are stored, the program can be read out and written without any correction and executed at the processor to which the program is read out and written as it was. If the program is written into a different address, the processor has a linking function for adjusting the addresses in a branching process or the data addresses and reads out and writes the program. And, if the program is written into a different kind of a processor, the program is read in the source program form of C language and compiled by a C compiler at the processor into which the program is written. The ABS control program carries out the self-diagnosis for checking normal operation of a brake system and sensors of wheel revolution speeds, disconnection of sensor wiring, etc. However, there happens such wasteful processing that the same results are calculated by using the same data since the self-diagnosis only requires shorter computing time than the data renewal interval. Then, it becomes possible to efficiently use a processor by such a program executing another function as the OBD program in accordance with the load states of a processor. Now, if a electrically rewritable memory having the restriction to rewriting times is used, it is needed to memorize the number of the executed rewriting times.

Figure 6:
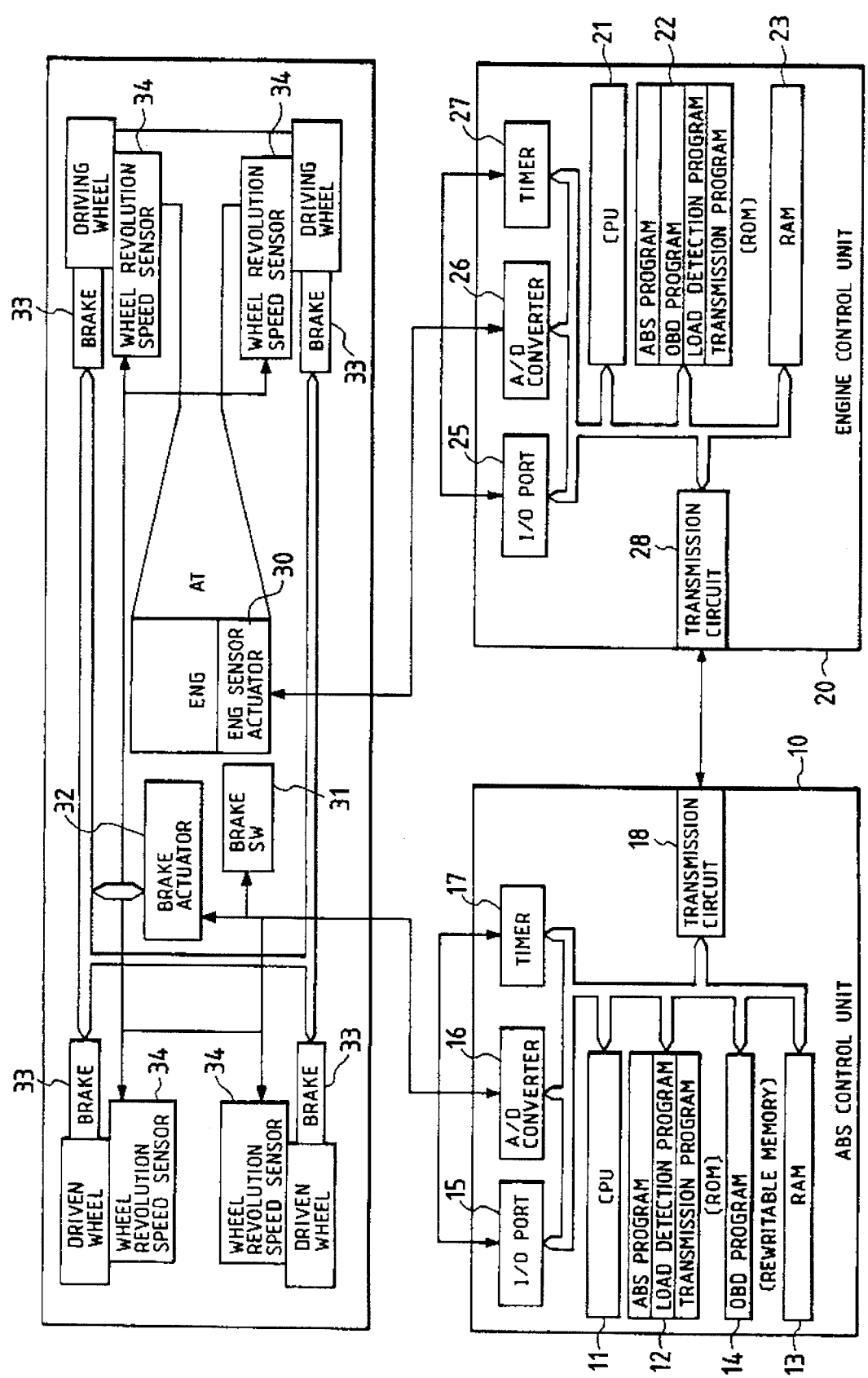
FIG. 6 shows an embodiment of a hardware constitution of a cooperative control apparatus.

FIG. 6 shows an embodiment of a hardware constitution of a cooperative control apparatus. An ABS control unit 10 comprises a processor 11, a ROM 12, a RAM 13, a ROM or an electrically rewritable memory 14, an I/O port 15, an A/D converter 16, a timer 17 and a transmission signal control circuit 18, and the ROM 12 includes a load detecting, a transmission and an ABS control program. If the memory 14 is a ROM, programs except the programs stored in the ROM 12 are stored in the memory 14 in advance, and if the memory is an electrically rewritable memory, programs stored in other control units connected to the ABS control unit are stored in the memory 14 via a transmission circuit 18. In this case, only the OBD program is stored in the memory 14, but another program such as a program for an Auto-Speed-Control Device (ASCD) may be stored in the ROM 14 of the ABS control unit in advance or another program such as a program for ASCD stored in the ROM of the engine control unit may be read out and written into the electrically rewritable memory 14 of the ABS control unit. Further, the ROM 12, the RAM 13, the ROM or the electrically rewritable memory 14, the I/O port 15, the A/D converter 16, the timer 17 and the transmission circuit 18 can be provided outside the ABS control unit 10. The engine control unit 20 comprises a processor 21, a ROM 22, a RAM 23, a I/O port 25, a A/D converter 26, a timer 27 and a transmission circuit 28 and the ROM 22 includes a load detecting, a transmission, an engine control and an OBD program. Further, the engine control unit 10 as well as the ABS control unit 20 may include an electrically rewritable memory, and such devices as the ROM 22, the RAM 13, the electrically rewritable memory (not shown in the figure), the I/O port 25, the A/D converter 26, the timer 27 and the transmission circuit 28 can be provided outside the engine control unit 20. The I/O port, the A/D converter and the timer of each control unit are connected to such sensors or actuators needed to control each part of an automobile such as wheel revolution speed sensors 34, a brake 33, an opening sensor of a throttle 30, an engine revolution speed sensor 30, an air flow meter 30, a brake switch sensor 31, brake actuators 32, an injection actuator 30, an ignition actuator 30 and so on.

Figure 7B:
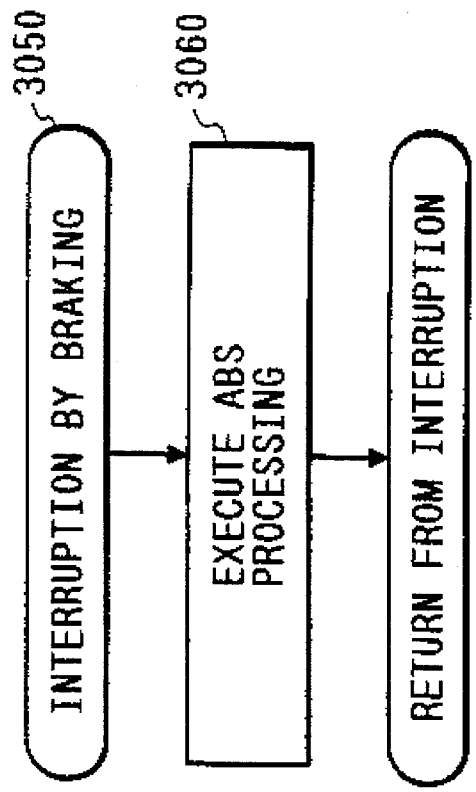
FIGS. 7A–7B are flow charts showing an embodiment of a cooperative automobile control method by adopting interruption processing on braking.
Figure 7A:
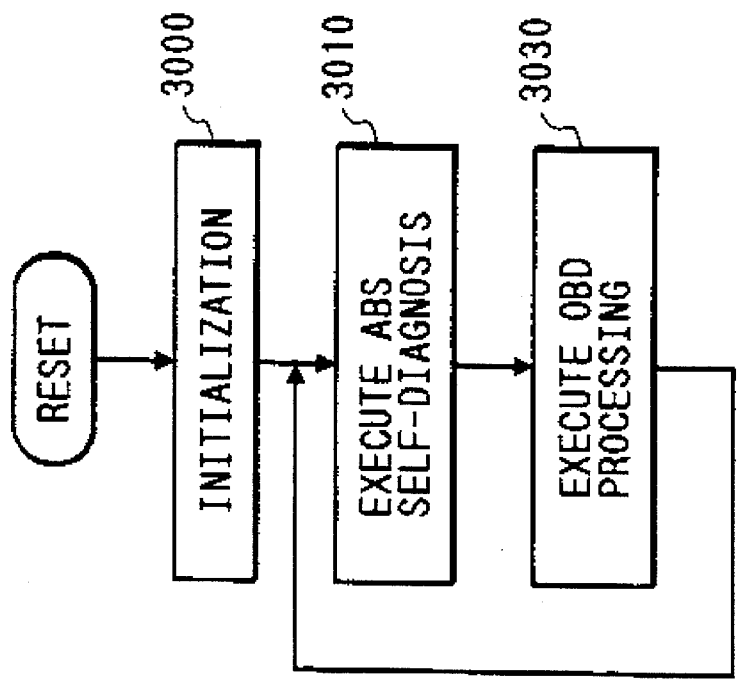

FIGS. 7A–7B are flow charts showing an embodiment of an cooperative automobile control method by adopting interruption processing on braking. When the power turns on, initialization of a timer, a port, an A/D converter, a RAM, a transmission system, etc. is done at the step 3000, an ABS self-diagnosis for checking normal operation of a brake system and sensors of wheel revolution speeds, disconnection of sensor wiring, etc. is done at the step 3010, an OBD processing by the OBD program stored in advance is done at the step 3030 and the process goes back to the step 3010 of the ABS self-diagnosis. Usually the steps from 3010 to 3030 are repeated. If the brake SW turns ON, the interruption occurs (3050) and the ABS processing for which a program is stored in advance, for example, in an electrically rewritable memory is executed at the step 3060. The interruption receiving is continued for the predetermined intervals after brake-SW-ON and the change from brake-SW-ON to brake-SW-OFF since only one time braking is rarely conducted but braking is usually conducted several times. Execution of the ABS program by adopting the interruption processing as mentioned above can realize quick control without time delay.

FIGS. 8A–8B are flow charts showing another embodiment of an cooperative automobile control method by adopting interruption processing on braking. In the processing (A) of FIG. 8, when a power turns on, initialization of a timer, a port, an A/D converter, a RAM, a transmission system, etc. is done at the step 3001, and an ABS self-diagnosis for checking normal operation of a brake system and sensors of wheel revolution speeds, disconnection of sensor wiring, etc. is done at the step 3011. And, whether an OBD program was read out and written into the processor from another processor is judged at the step 3021. If the program is already read out and written, and an OBD processing is done at the step 3031, and if it is not read out and written yet or another program is written, then the OBD program stored in another processor is read out and written at the step 3041. Then, the read out and written OBD program is executed at the step 3031 and the process goes back to the step 3011 of the ABS self-diagnosis. Usually the steps from 3011 to 3031 are repeated. On the other hand, in the processing (B) of FIG. 8, if the brake SW turns ON, the interruption occurs (3051) and an ABS processing is executed at the step 3061. The interruption receiving is continued for the predetermined intervals after brake-SW-ON and the change from brake-SW-ON to brake-SW-OFF since only one time braking is rarely conducted but braking is usually conducted several times. Execution of the ABS program by adopting the interruption processing as mentioned above can realize quick control without time delay. Furthermore, it is possible to smooth loads of processors used for automobile control by the cooperative control method wherein a processor in the lower load states execute a program which is stored in another processor in the higher load states and read out and written into the processor in the lower load states as explained in the above embodiment.

FIGS. 9A–9E are flow charts showing an embodiment of a cooperative automobile control method by adopting interruption processing and content change of a vector base register on braking. When a power turns on, initialization of a timer, a port, an A/D converter, a RAM, a transmission system, etc. is done at the step 4000, an ABS self-diagnosis for checking normal operation of a brake system and sensors of wheel revolution speeds, disconnection of sensor wiring, etc. is done at the step 4010. On the other hand, the interruption is brought about by a timer in every 10 ms and if the content of a vector base register is X (4020), then an OBD processing by an OBD program stored in advance is executed at the step 4040. And, if the content of the vector base register is Y (4100), then an ABS processing is executed at the step 4110. The content change of the vector base register is caused by the interruption on braking (4060) and the interruption on brake off delay (4080). If the brake SW is ON, then the interruption on braking occurs (4060) and the content of the vector base register is changed to Y at the step 4070. And, if the brake SW is OFF, then the interruption on brake off delay occurs (4080) and the content of the vector base register is changed to X at the step 4090. As explained above, different programs can be executed by changing the content of the vector base register in the same interruption processing.

FIGS. 10A–10E are flow charts showing another embodiment of a cooperative automobile control method by adopting interruption processing and content change of a vector base register on braking. In the process (A) of FIG. 10, when the power turns on, initialization of a timer, a port, an A/D converter, a RAM, a transmission system, etc. is done at the step 4001, and an ABS self-diagnosis for checking normal operation of a brake system and sensors of wheel revolution speeds, disconnection of sensor wiring, etc. is done at the step 4011. On the other hand, in the process (B) of FIG. 10, the interruption is brought about by a timer in every 10 ms and if the content of the vector base register is X (4021), then whether an OBD program was read out and written into the processor from another processor is judged at the step 4031. If the program is already read out and written, then the OBD processing is done at the step 4041, and if it is not read out and written yet or another program is already written, then the OBD program stored in another processor is read out and written at the step 4051. Then, the read out and written OBD program is executed at the step 4041. Then, in the processing (E) of FIG. 10, if the content of the vector base register is Y (4101), an ABS processing is executed. The content change of the vector base register is done by the interruption (4061) on braking shown by the processing (C) of FIG. 10 or by the interruption (4081) on brake off delay shown by the processing (D) of FIG. 10, and if the brake SW is on, then the interruption on braking occurs (4061) and the content of the vector base register is changed to Y at the step 4071. At a predetermined interval after the change from brake-SW-ON to brake-SW-OFF, the interruption on brake off delay occurs at the step 4081 and the content of the vector base register is changed to X at the step 4091. As explained above, different programs can be executed by changing the content of the vector base register in the same interruption processing. Further, it is possible to smooth loads of processors used for automobile control by the cooperative control method wherein a processor in the lower load states execute a program which is stored in another processor in the higher load states and read out and written into the processor in the lower load states as explained in the above embodiment.

Figure 11:
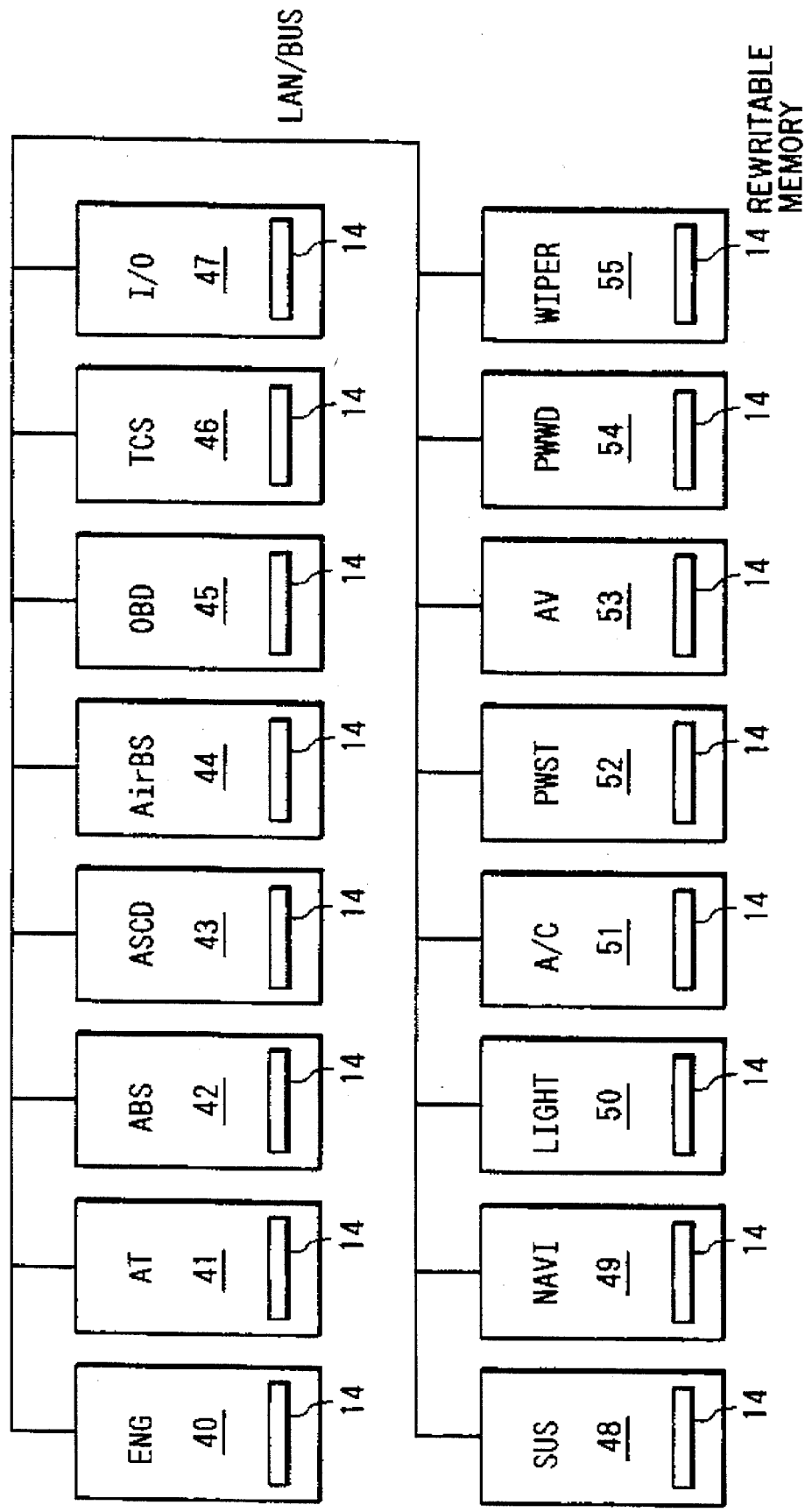
FIG. 11 shows a block diagram of an embodiment in which a plurality of processors for cooperatively controlling an automobile are connected by transmission means.

FIG. 11 shows a block diagram of an embodiment in which a plurality of processors for cooperatively controlling an automobile are connected by transmission means. Processors used to cooperative automobile control for such systems as an engine (ENG) 40, an automatic transmission (AT) 41, an ABS 42, an ASCD 43, an air bag system (AirBS) 44, an OBD system 45, a traction system (TCS) 46, an I/O control processor 47, an active suspension (SUS), a navigation system (NAVI) 49, a light system (LIGHT) 50, an air conditioner (A/C) 51, a power steering system (PWST) 52, an audio/video system (AV) 53, a power window system (PWWD) 54, a wiper system (WIPER) and so on are connected by transmission means such as LAN or BUS. An electrically rewritable memory 14 is provided in the ABS control processor, and when the load of the ABS control processor is low, a program stored in another processor is read out and written into the rewritable memory 14 and executed by the ABS control professor. Further, an electrically rewritable memory 14 may be provided in a control processor except the ABS control processor, and a program stored in another control processor except the processor having the electrically rewritable memory may be read out and written into the rewritable memory and executed. By the above-mentioned control system in which a plurality of control processors are connected by transmission means, plural programs stored in plural processors can be read out and written into an electrically rewritable memory 14 in turn and executed. Further, if the memory is managed by the virtual memory method, programs having the size beyond the capacity of the memory can be executed. Then, a processor can executes all programs stored in the processors connected to each other by transmission means.

Figure 12A:
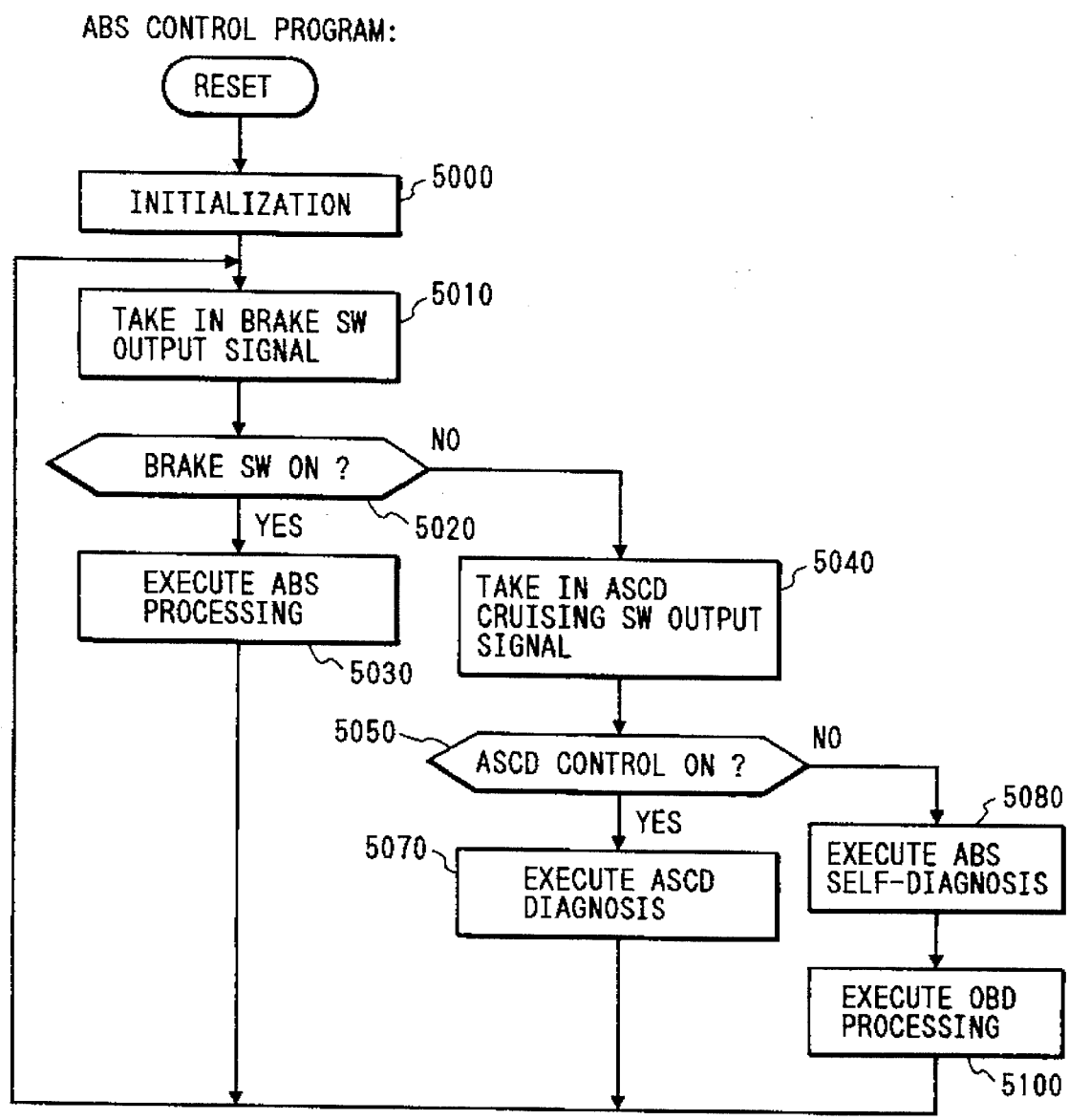
FIGS. 12(a) and 12(b) are flow charts showing an embodiment of an automobile control cooperatively conducted by an ABS and an ASCD control program.
Figure 12B:
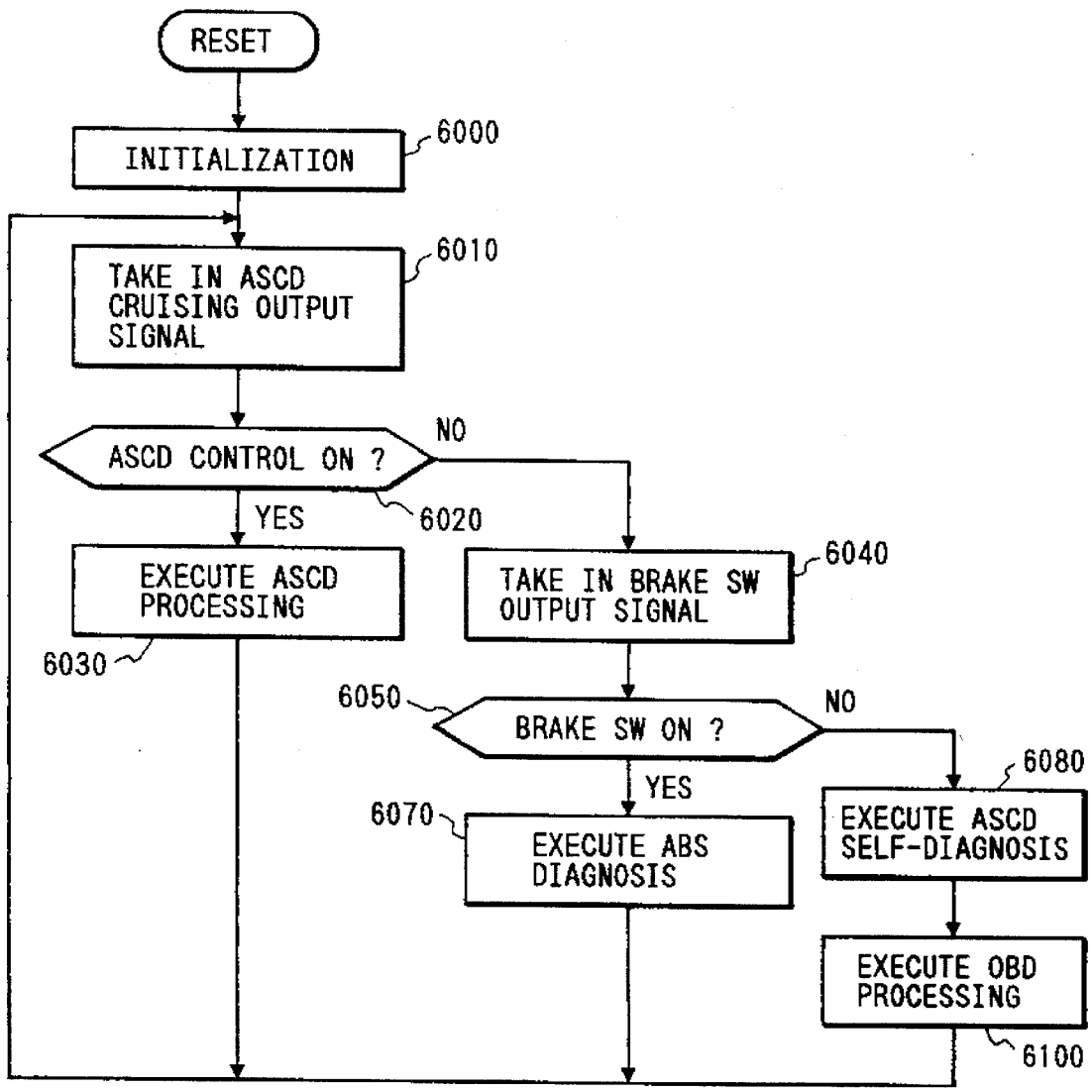

FIGS. 12(a) and 12(b) are flow charts showing an embodiment of an automobile control cooperatively conducted by an ABS and an ASCD control program. In the ABS control program shown by FIG. 12(a), when the power turns on, initialization of a timer, a port, an A/D converter, a RAM, a transmission system, etc. is done at the step 5000, an output signal of a brake SW is taken in at the step 5010, and whether the brake SW is ON or OFF is judged at the step 5020. And, if the brake SW is ON, then an ABS control is executed at the step 5030 and the process goes back to the step 5010 of taking in the output signal of the brake SW. If the brake SW is OFF, an output signal of an ASCD cruising SW is taken in at the step 5040, and whether an ASCD control is ON or OFF is judged at the step 5050. And, if the ASCD control is ON, then the ASCD diagnosis program stored in advance is executed by the ABS control processor at the step 5070, and if the ASCD control is in OFF, then the ABS self-diagnosis and an OBD program stored in advance are executed at the steps 5080 and 5100 and the process goes back to the step 5010 of taking in an output signal of a brake SW. Those processes are repeated. In the ASCD control program shown by FIG. 12(b), when a power turns on, initialization of a timer, a port, an A/D converter, a RAM, a transmission system, etc. is done at the step 6000, the output signal of the ASCD cruising SW is taken in at the step 6010, and whether the ASCD control is ON or OFF is judged at the step 6020. And, if the ASCD control is ON, then the ASCD control is executed at the step 6030 and the process goes back to the step 6010 of taking in the output signal of the ASCD cruising SW. If the ASCD control is OFF, the output signal of the brake SW is taken in at the step 6040, and whether the brake SW is ON or OFF is judged at the step 6050. And, if the brake SW is ON, then the ABS diagnosis stored in advance is executed by the ASCD control processor at the step 6070, and if the brake SW is OFF, then the ASCD self-diagnosis and the OBD stored in advance are executed at the steps 6080 and 6100 and the process goes back to the step 6010 of taking in the output signal of the ASCD cruising SW. Those processes are repeated. By the embodiment, the processors are efficiently used and the safety on running of an automobile is also improved since the ABS diagnosis is executed by the ASCD control processor whose load is a little when the load of the ABS control processor is much and vice versa, and further the both processor execute the OBD program in the remaining time. Then, control processing speed is improved as a whole by supporting task executions to be done in other processors. Although the cooperative automobile control by the ABS and the ASCD control is described in this embodiment, the present invention is not restricted to the embodiment. In the cooperative automobile control by the present invention, since all processors for controlling an automobile are connected by transmission means and the loads of the processors are smoothed in accordance with task amounts of each processor which change corresponding to running states of an automobile, the processors are efficiently used, and control processing speed and also the running safety of an automobile are improved.

Figure 13A:
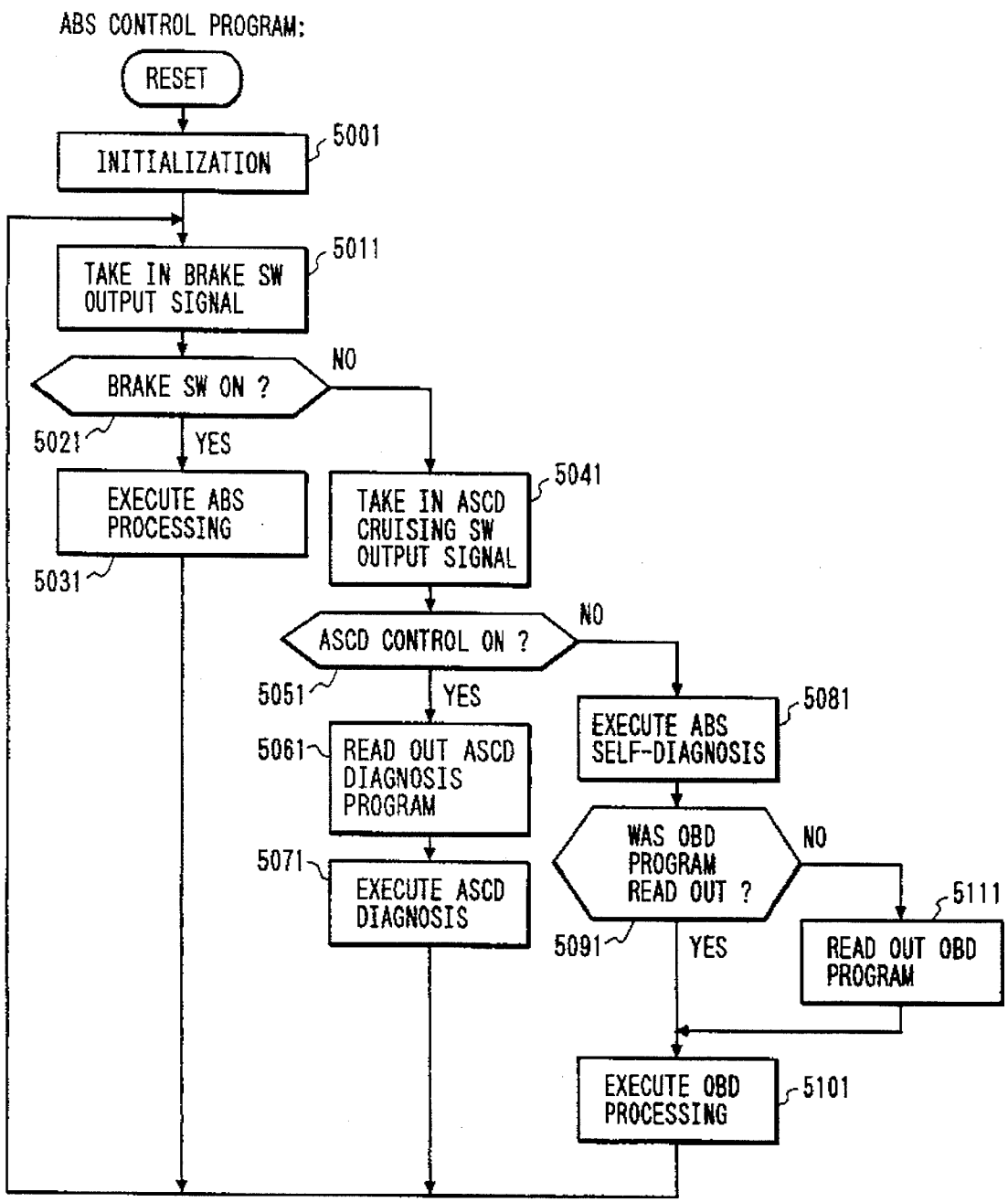
FIGS. 13(a) and 13(b) are flow charts showing another embodiment of an automobile control cooperatively conducted by an ABS and an ASCD control program.
Figure 13B:
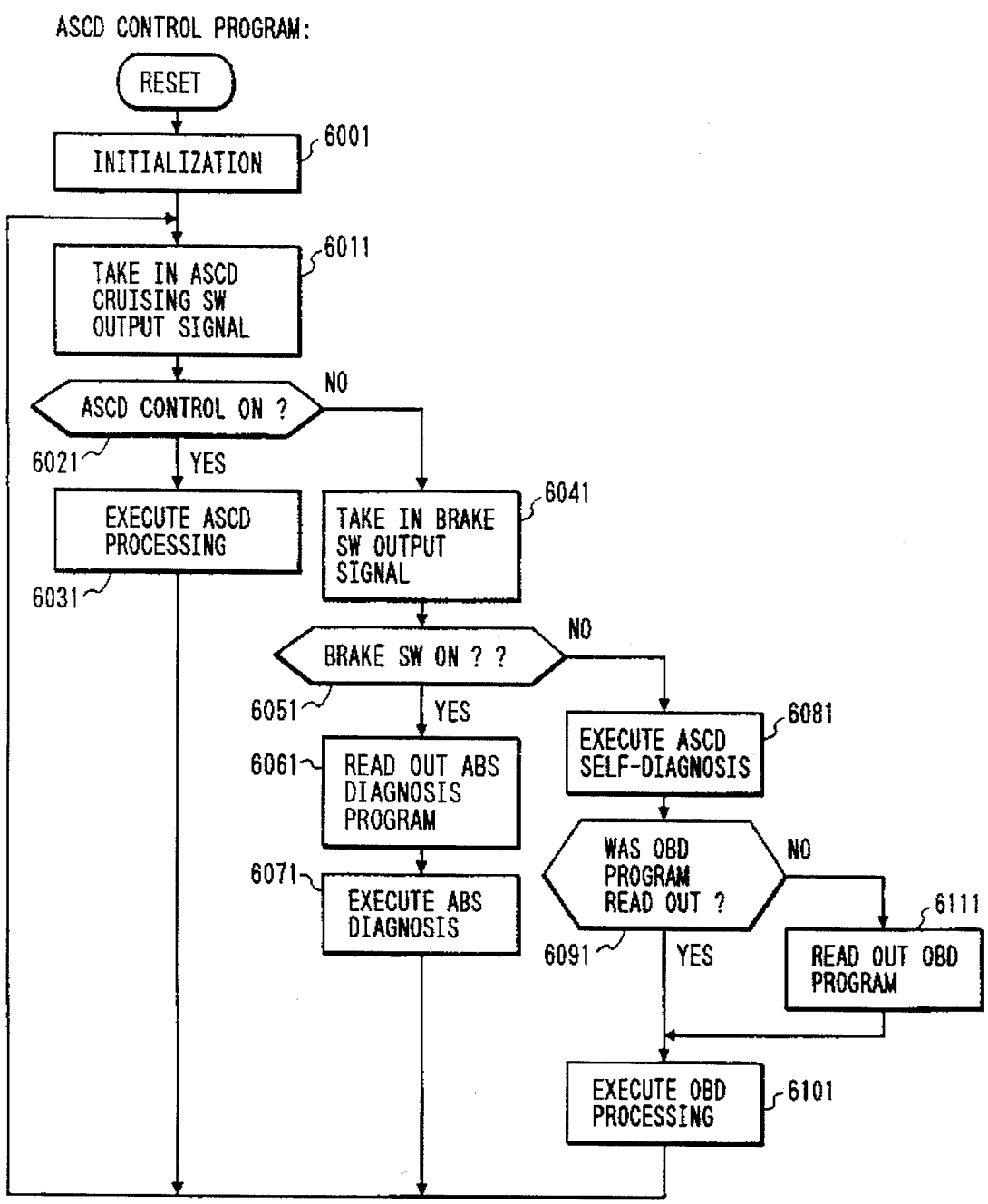

FIGS. 13(a) and 13(b) are flow charts showing another embodiment of an automobile control cooperatively conducted by an ABS and an ASCD control program. In the ABS control program shown by FIG. 13(a), when the power turns on, initialization of a timer, a port, an A/D converter, a RAM, a transmission system, etc. is done at the step 5001, an output signal of a brake SW is taken in at the step 5011, and whether the brake SW is ON or OFF is judged at the step 5021. And, if the brake SW is ON, then an ABS control is executed at the step 5031 and the process goes back to the step 5011 of taking in the output signal of the brake SW. If the brake SW is OFF, an output signal of an ASCD cruising SW is taken in at the step 5041, and whether an ASCD control is ON or OFF is judged at the step 5051. And, if the ASCD control is ON, then an ASCD diagnosis is read out and written into an electrically rewritable memory of an ABS control processor at the step 5061 and executed at the step 5071, and if the ASCD control is in OFF, then an ABS self-diagnosis is executed. And, whether an OBD program was read out and written into the ABS control processor from another processor is judged at the step 5091. If the program is already read out and written, then the OBD program is executed at the step 5101, and if it is not read out and written yet or another program is written, then the OBD program stored in an engine control processor is read out and written at the step 5111. Then, the read out and written OBD program is executed at the step 5101 and the process goes back to the step 5011. On the other hand, in the ASCD control program shown by FIG. 13(b), when a power turns on, initialization of a timer, a port, an A/D converter, a RAM, a transmission system, etc. is done at the step 6001, an output signal of an ASCD cruising SW is taken in at the step 6011, and whether the ASCD control is ON or OFF is judged at the step 6021. And, if the ASCD control is ON, then the ASCD control is executed at the step 6031 and the process goes back to the step 6011 of taking in the output signal of the ASCD cruising SW. If the ASCD control is OFF, the output signal of the brake SW is taken in at the step 6041, and whether the brake SW is ON or OFF is judged at the step 6051. And, if the brake SW is ON, then the ABS diagnosis is read out and written into an electrically rewritable memory of the ASCD control processor at the step 6061 and executed at the step 6071, and if the brake SW is OFF, then an ASCD self-diagnosis is executed. And, whether the OBD program was read out and written into the ASCD control processor is judged at the step 6091. If the program is already read out and written, then the OBD program is executed at the step 6101, and if it is not read out and written yet or another program is already written, then the OBD program stored in the engine control processor is read out and written at the step 6111. Then, the read out and written OBD program is executed at the step 6101 and the process goes back to the step 6011. By the embodiment, the processors are efficiently used and the safety on running of an automobile is also improved since the ABS diagnosis is executed by the ASCD control processor whose load is a little when the load of the ABS control processor is much and vice versa, and further the both processor execute the OBD program in the remaining time. In the execution of the OBD program, if the OBD program is not read out and not written into each of the ABS and the ASCD control processor yet, each program reads out and writes the OBD program into an electrically rewritable memory provided in each processor. Then, control processing speed is improved by supporting task executions to be done in other processors. Although the cooperative automobile control the ABS and the ASCD control is described in this embodiment, the present invention is not restricted to the embodiment. In the cooperative automobile control by the present invention, since all processors for controlling an automobile are connected by transmission means and the loads of the processors are smoothed in accordance with task amounts of each processor which change corresponding to running states of an automobile, the processors are efficiently used, and control processing speed and also the running safety of an automobile are improved.

Figure 14B:
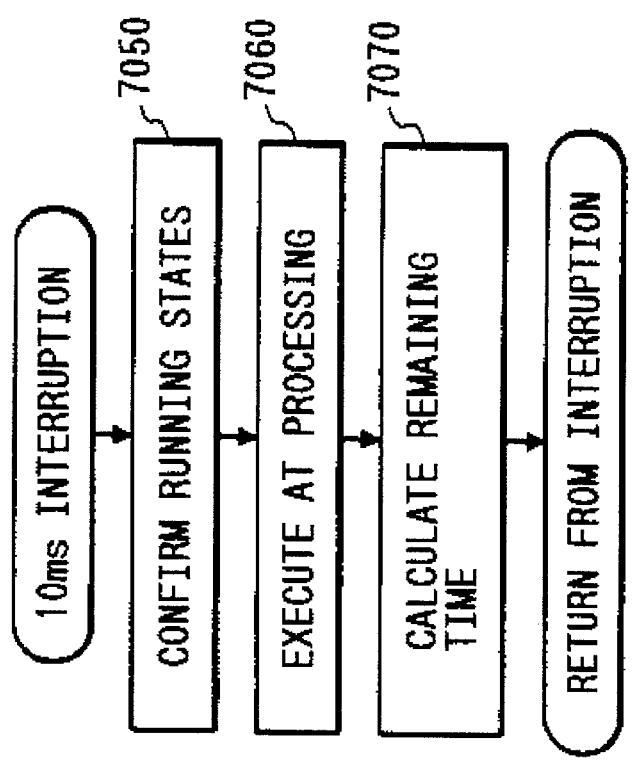
FIGS. 14A–14B are flow charts showing an embodiment of executing another program based on load detection in an AT control processor.
Figure 14A:
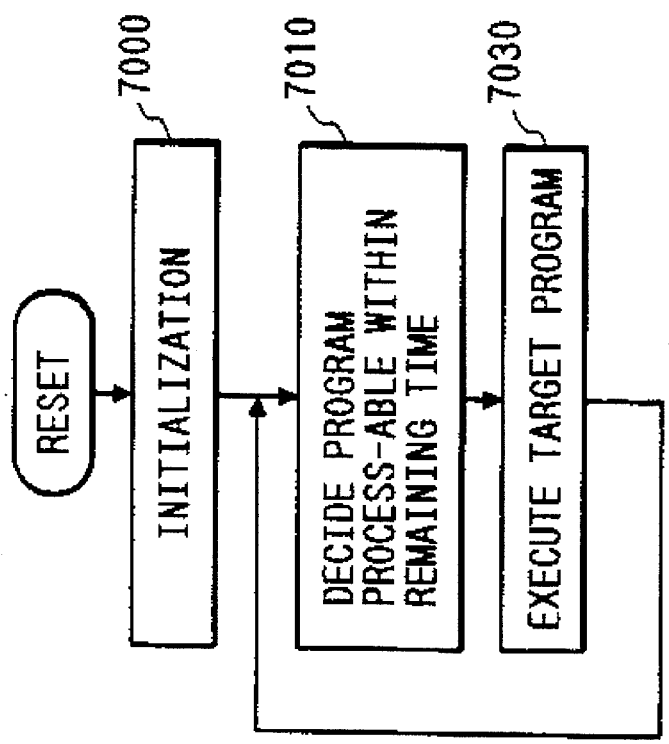

FIG. 14 is a flow chart showing an embodiment of executing another program based on load detecting in an AT control processor. In an AT control program, when the power turns on, initialization of a timer, a port, an A/D converter, a RAM, a transmission system, etc. is done at the step 7000, a program process-able within remaining time is decided at the step 7010, a target program is executed at the step 7030 and the process goes back to the step 7010 of deciding a program process-able within remaining time. The remaining time is the time of subtracting the AT control processing time needed to run an automobile from the time interval for invoking the AT control program, in which controls except the AT control can be executed. The AT control program invoked by 10 ms interruption judges the running states from the wheel revolution speed, the number of engine revolution, the number of turbine revolution, the opening of throttle, the gear position, the range SW position, the change gear mode SW position, etc. at the step 7050, executes the AT control in accordance with the running states at the step 7060, and calculates the remaining time at the step 7070. The calculation of the remaining time is done by using the value of a timer counter for invoking the 10 ms interruption. Other timer counters can be also used. The embodiment is effectual for such a control whose processing time changes corresponding to the running states as the AT control.

Figure 15B:
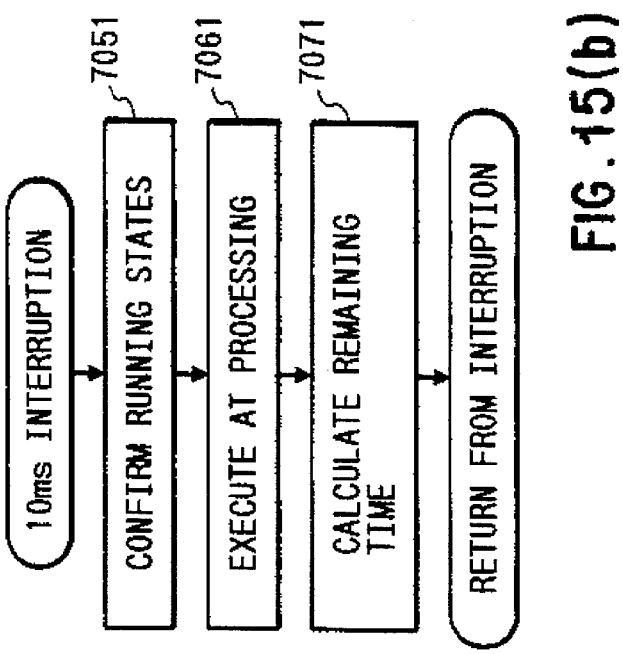
FIGS. 15A–15B are flow charts showing another embodiment of cooperatively executing another program based on load detection in an AT control processor.
Figure 15A:
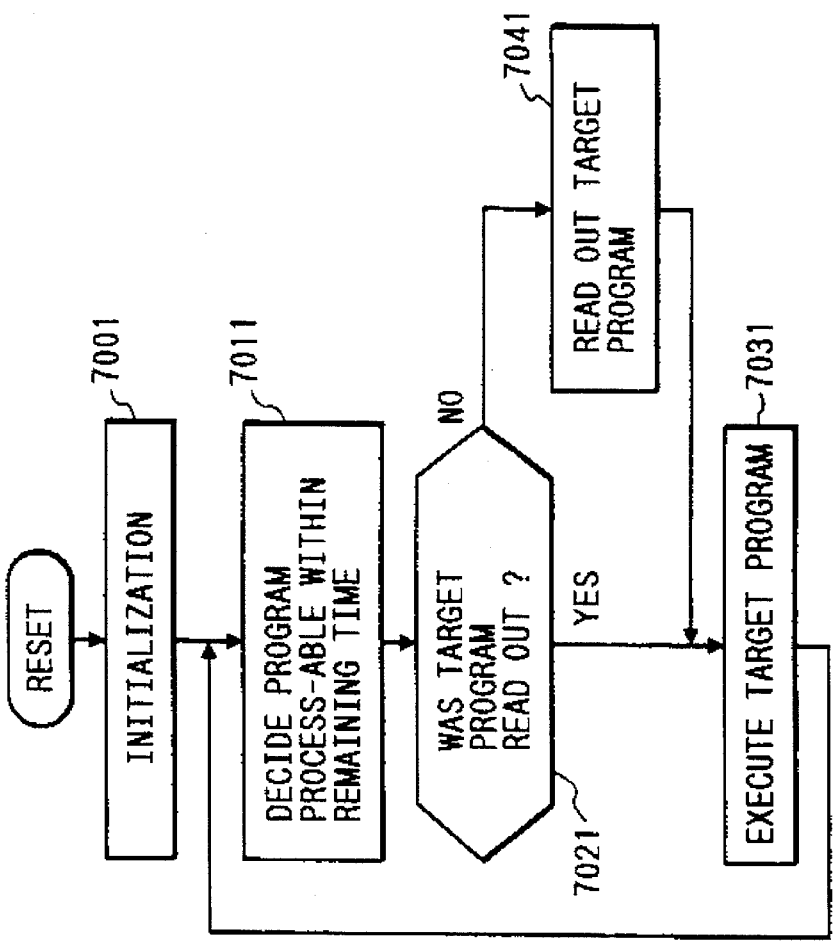

FIGS. 15A–15B are flow charts showing another embodiment of cooperatively executing another program execution based on load detecting in an AT control processor. In the process (A) of FIG. 15, when the power turns on, initialization of a timer, a port, an A/D converter, a RAM, a transmission system, etc. is done at the step 7001, a program process-able within remaining time is decided at the step 7011. And, whether the decided target program was read out and written into the AT control processor from another processor is judged at the step 7021. If the program is already read out and written, then the target program is executed at the step 7031, and if it is not read out and written yet or another program is already written, then the target program stored in another processor is read out and written at the step 7041. Then, the read out and written target program is executed at the step 7031 and the process goes back to the step 7011. In the process (B) of FIG. 15, the AT control program invoked by 10 ms interruption judges the running states from the wheel revolution speeds, the number of engine revolution, the numbers of turbine revolution numbers, the opening of throttle, the gear position, the range SW position, the change gear mode SW position, etc. at the step 7051, executes the AT control in accordance with the running states at the step 7061, and calculates the remaining time at the step 7071. The calculation of the remaining time is done by using the value of a timer counter for invoking the 10 ms interruption. Another timer counter can be also used. The embodiment is effectual for such a control whose processing time changes corresponding to the running states as the AT control. Further, it becomes possible to smooth loads of processors by executing a target program stored in another processor in accordance with the load states of the AT control processor.

Figure 16:
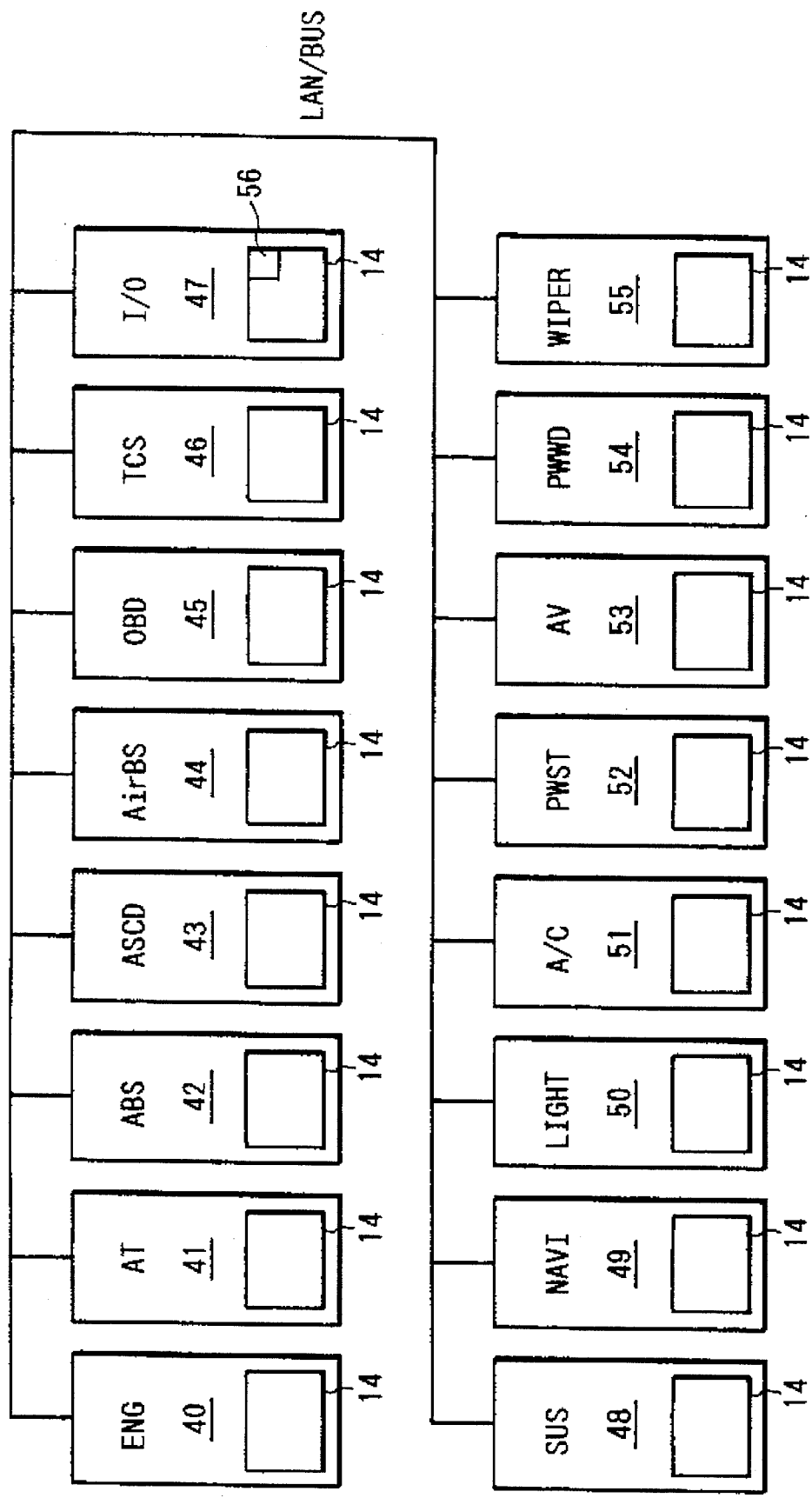
FIG. 16 shows a block diagram of an embodiment in which an I/O control processor detects loads of other processors for cooperatively controlling an automobile.

FIG. 16 shows a block diagram of an embodiment in which an I/O control processor detects loads of other processors for cooperatively controlling an automobile. Processors used to cooperative automobile control for such systems as an engine (ENG) 41, an automatic transmission (AT) 41, an ABS 42, an ASCD 43, an air bag system (AirBS) 44, an OBD system 45, a traction system (TCS) 46, an I/O control processor 47, an active suspension (SUS), a navigation system (NAVI) 49, a light system (LIGHT) 50, an air conditioner (A/C) 51, a power steering system (PWST) 52, an audio/video system (AV) 53, a power window system (PWWD) 54, a wiper system (WIPER) and so on are connected by transmission means such as LAN or BUS. In the I/O processor 47, a function 56 for detecting loads of other processors and delivering the information on load of each processor to other processors is provided. By the function 56 of the I/O processor 47, the processing speed of each processor is increased since each processor except the I/O processor has not to detect loads of processors. The load detection can be also done by a processor except the I/O processor or plural processors. And, providing an exclusive processor for the load detection is also effective.

Figure 17B:
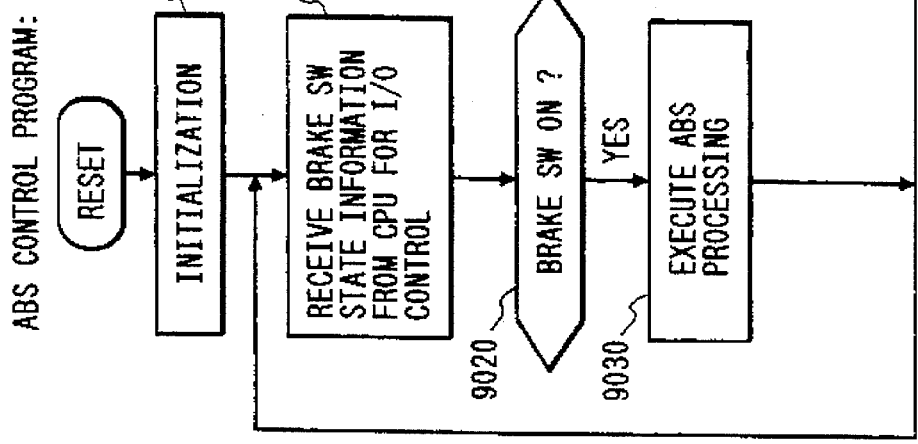
FIGS. 17(a) and 17(b) are flow charts showing an embodiment of detecting loads of other control processors by an I/O control processor in cooperatively controlling an automobile.
Figure 17A:
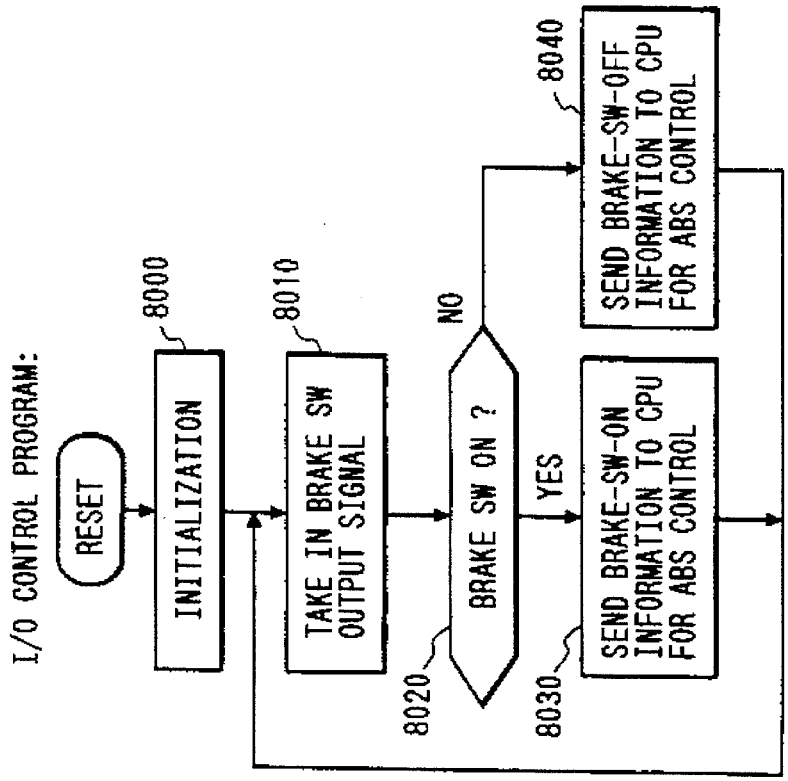

FIGS. 17(a) and (b) are flow charts showing another embodiment of detecting loads of other control processors by an I/O control processor in cooperatively controlling an automobile. In the I/O control program shown by FIG. 17(a), when a power turns on, initialization of a timer, a port, an A/D converter, an RAM, a transmission system, etc. is done at the step 8000, an output signal of a brake SW is taken in at the step 8010, and whether the brake SW is ON or OFF is judged at the step 8020. And, if the brake SW is ON, then the I/O control program sends the information of the brake-SW-ON at the step 8030 to the ABS control processor. If the brake SW is OFF, then the I/O control program sends the information of the brake-SW-OFF at the step 8040 to the ABS control processor and the process goes back to the step 8010. In the ABS control program shown by FIG. 17(b), when a power turns on, initialization of a timer, a port, an A/D converter, a RAM, a transmission system, etc. is done at the step 9000, the brake SW state information is received from the I/O control processor at the step 9010, and whether the brake SW is ON or OFF is judged at the step 9020. And, if the brake SW is ON, then the ABS control processing is executed at the step 9030 and the process goes back to the step 9010 of receiving the brake SW state information from the I/O control processor. If the brake SW is OFF, then the ABS self-diagnosis and the OBD processing are executed at the steps 9040 and 9060, respectively. And, the process goes back to the step 9010.

Figure 18A:
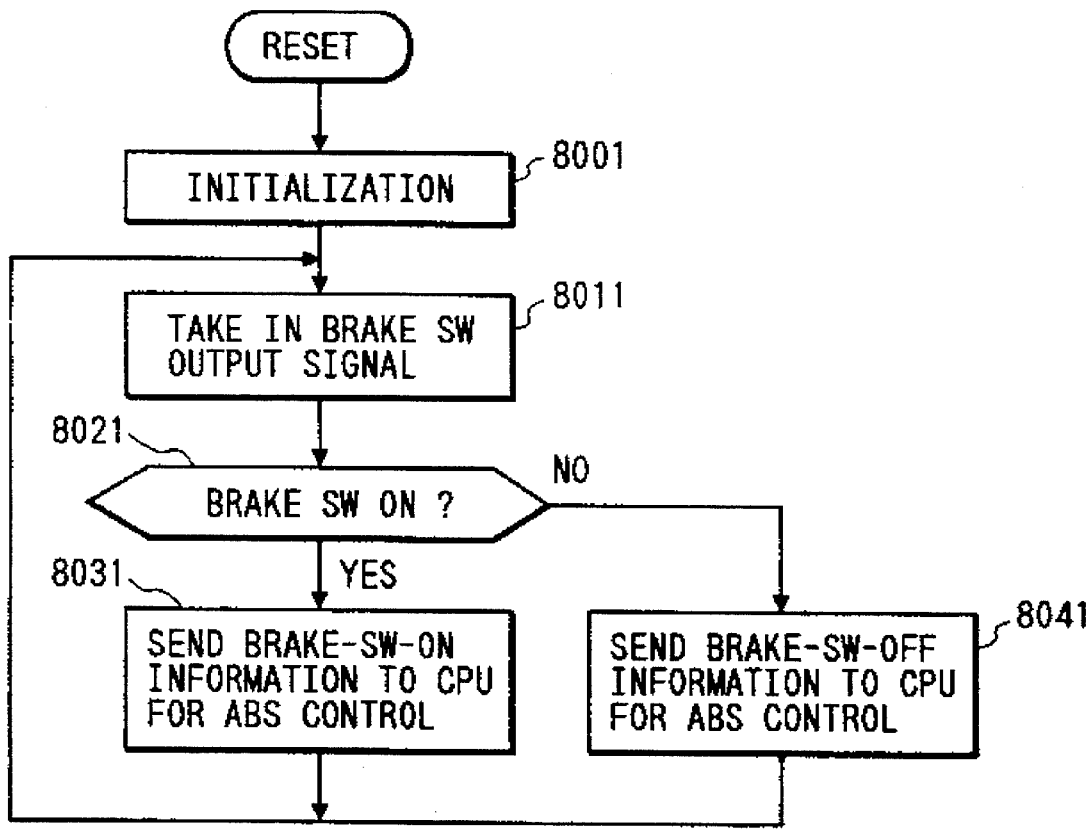
FIGS. 18(a) and 18(b) are flow charts showing another embodiment of detecting loads of other control processors by an I/O control processor in cooperatively controlling an automobile.
Figure 18B:
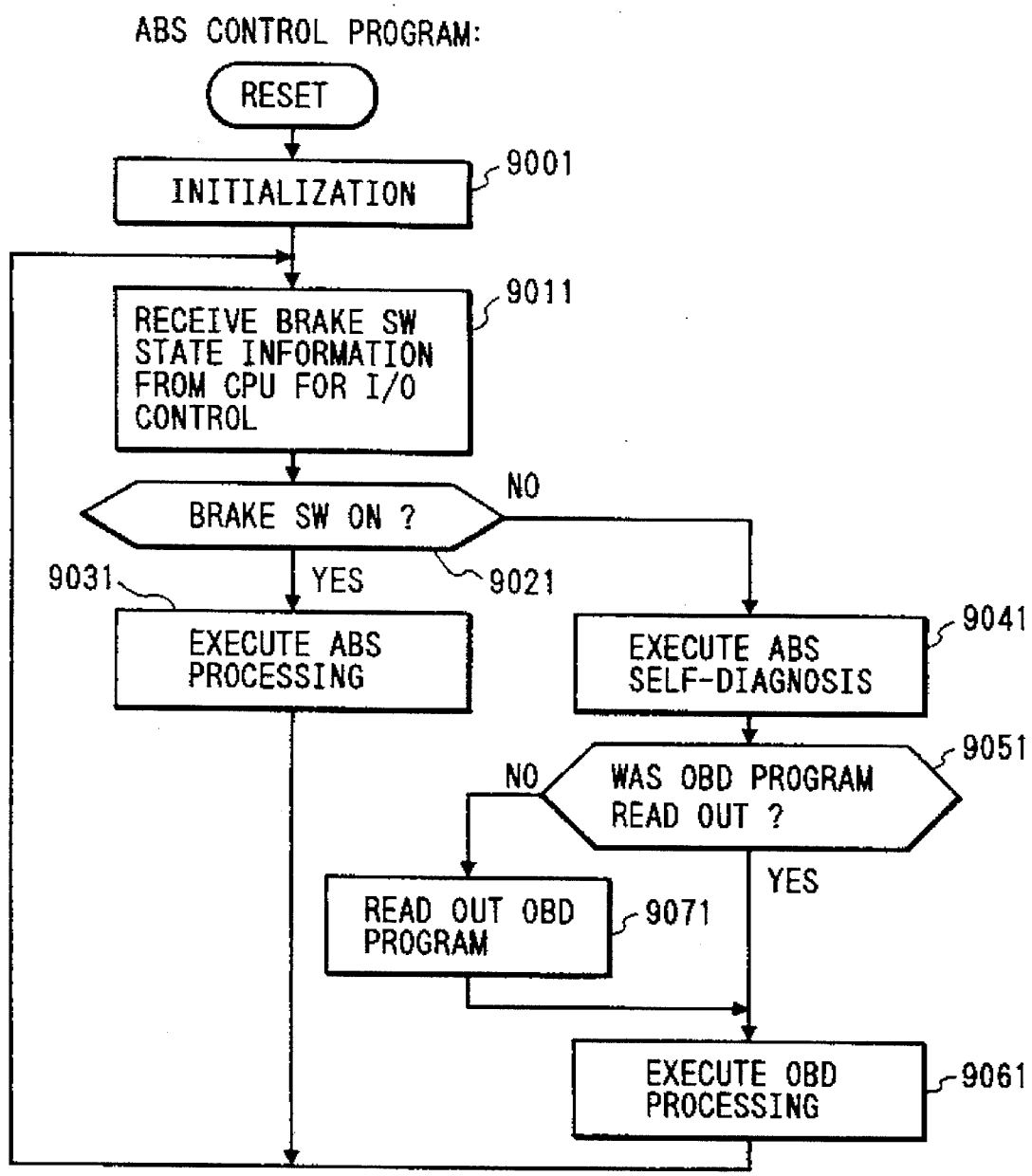

FIGS. 18(a) and (b) are flow charts showing another embodiment of detecting loads of other control processors by an I/O control processor in cooperatively controlling an automobile. In an I/O control program shown by FIG. 18(a), when a power turns on, initialization of a timer, a port, an A/D converter, a RAM, a transmission system, etc. is done at the step 8001, an output signal of a brake SW is taken in at the step 8011, and whether the brake SW is ON or OFF is judged at the step 8021. And, if the brake SW is ON, then the I/O control program sends the information of the brake-SW-ON at the step 8031 to the ABS control processor. If the brake SW is OFF, then the I/O control program sends the information of the brake-SW-OFF at the step 8041 to an ABS control processor and the process goes back to the step 8011. On the other hand, in an ABS control program shown by FIG. 18(b), when a power turns on, initialization of a timer, a port, an A/D converter, a RAM, a transmission system, etc. is done at the step 9001, the brake SW state information is received from the I/O control processor at the step 9011, and whether the brake SW is ON or OFF is judged at the step 9021. And, if the brake SW is ON, then an ABS control processing is executed at the step 9031 and the process goes back to the step 9011 of receiving the brake SW state information from the I/O control processor. If the brake SW is OFF, then an ABS self-diagnosis is executed at the step 9041. And, whether an OBD program was read out and written into the ABS control processor from another processor is judged at the step 9051. If the program is already read out and written, then the OBD program is executed at the step 9061, and if it is not read out and written yet or another program is already written, then the OBD program stored in the engine control processor is read out and written at the step 9071. Then, the read out and written OBD program is executed at the step 2061 and the process goes back to the step 9011 of receiving the brake SW state information from the I/O control processor.

FIG. 19 shows a block diagram of an embodiment in which integral type processors are used for cooperatively controlling an automobile. The integral type processor system for cooperatively controlling an automobile comprises an integrated ENG-AT-OBD control processor 60, an integrated ABS-TCS control processor 61, an AirBS control processor 44, an I/O control processor 47, an integrated SUS-ASCD control processor 62, an integrated NAVI-AV control processor 63 and an integrated LIGHT-PWST-PWWD-WIPER-A/C control processor 64 which are connected by such transmission means as LAN, BUS and so on. In such an integral type processor, the load of each processor is measured by itself and the control processing corresponding to the load information can be executed. Then, the control processing speed is increased by such an integral type processor since the control data are commonly used by the integrated control programs in the integral type processor.

By the present invention, it is possible to efficiently utilize processors since each processor executes the necessary and minimum tasks based on the control processing duty needed to be done in accordance with the running states of an automobile and can execute another control program stored in other processor.

What is claimed is:

1. An automobile control method for controlling each part of an automobile using a plurality of control units, which are connected by transmission lines with each other, including computers and memories, comprising the step of:

executing at least one of a plurality of control task programs stored in ones of said plurality of control units for controlling each part of the automobile, by at least one other of said plurality of control units having a lower processing load;

wherein at least one of said plurality of control units having said lower processing load judges its having said lower processing load upon receiving information on running state changes of said automobile external to said plurality of control units, reads out at least one of said plurality of control task programs stored in other of said plurality of control units, and executes said at least one control task program.

2. An automobile control system for controlling each part of an automobile, comprising:

plural control units connected by transmission lines with each other, each control unit including a computer;

a memory provided in at least one of said plural control units having a lower control processing load than other of said plural control units, said memory memorizing at least one of a plurality of control task programs stored in said other control units which is transferred to said memory via said transmission lines;

means in each control unit for judging, upon receiving information on running state changes of said automobile external to said plurality of control units, when said at least one of said plural control units has said lower control processing load.

3. An automobile control system according to claim 2, wherein said memory is an electrically rewritable memory, said electrically rewritable memory memorizing at least one of the plurality of control task programs stored in other of said plural control units having a high control processing load.

4. An automobile control system according to claim 2, wherein said memory is a rewritable memory.

5. An automobile control system according to claim 2, wherein said plural control units are of a same type; and wherein an address in said memory to which at least one of said plurality of control task programs is transferred being a same address in another memory of at least one of said other control units from which at least one of said plurality of control task programs is transferred.

6. An automobile control system according to claim 2, wherein said plural control units are of different types; and wherein at least one of said control task programs is transferred in a source program form of C language, compiled by a C compiler and stored in said memory.

\* \* \* \* \*